(12) United States Patent
Clifton et al.

(10) Patent No.: US 10,437,933 B1
(45) Date of Patent: Oct. 8, 2019

(54) MULTI-DOMAIN MACHINE TRANSLATION SYSTEM WITH TRAINING DATA CLUSTERING AND DYNAMIC DOMAIN ADAPTATION

(71) Applicant: Amazon Technologies, Inc., Seattle, WA (US)

(72) Inventors: Ann Clifton, Pittsburgh, PA (US); Michael Denkowski, Pittsburgh, PA (US); Alon Lavie, Pittsburgh, PA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/238,101

(22) Filed: Aug. 16, 2016

(51) Int. Cl.
*G06F 17/28* (2006.01)

(52) U.S. Cl.
CPC ........ *G06F 17/2818* (2013.01); *G06F 17/289* (2013.01)

(58) Field of Classification Search
CPC .. G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881
USPC ....................................................... 704/2–8
See application file for complete search history.

(56) References Cited

U.S. PATENT DOCUMENTS

| | | | | |
|---|---|---|---|---|
| 6,484,136 | B1* | 11/2002 | Kanevsky | G06F 17/2765 704/255 |
| 8,798,984 | B2* | 8/2014 | Cancedda | G06F 17/2818 704/2 |
| 9,218,360 | B2* | 12/2015 | Liu | G06F 17/30241 |
| 9,582,499 | B2* | 2/2017 | Mathur | G06F 17/2818 |
| 2001/0029455 | A1* | 10/2001 | Chin | G06F 17/273 704/277 |
| 2003/0125927 | A1* | 7/2003 | Seme | G06F 17/289 704/3 |
| 2004/0148278 | A1* | 7/2004 | Milo | G06F 17/2205 |
| 2007/0094169 | A1 | 4/2007 | Yamada et al. | |
| 2009/0125497 | A1* | 5/2009 | Jiang | G06F 17/30669 |
| 2012/0150529 | A1* | 6/2012 | Kim | G06F 17/289 704/2 |
| 2014/0067361 | A1* | 3/2014 | Nikoulina | G06F 17/2818 704/2 |

(Continued)

OTHER PUBLICATIONS

Sennrich, Mixture-modeling with unsupervised clusters for domain adaptation in statistical machine translation, 2012, Proceedings of the 16th EAMT Conference, pp. 185-192.*

(Continued)

*Primary Examiner* — Lamont M Spooner
(74) *Attorney, Agent, or Firm* — Lee & Hayes, P.C.

(57) ABSTRACT

A machine translation system capable of clustering training data and performing dynamic domain adaptation is disclosed. An unsupervised domain clustering process is utilized to identify domains in general training data that can include in-domain training data and out-of-domain training data. Segments in the general training data are then assigned to the domains in order to create domain-specific training data. The domain-specific training data is then utilized to create domain-specific language models, domain-specific translation models, and domain-specific model weights for the domains. An input segment to be translated can be assigned to a domain at translation time. The domain-specific model weights for the assigned domain can be utilized to translate the input segment.

20 Claims, 13 Drawing Sheets

(56) References Cited

U.S. PATENT DOCUMENTS

| | | | |
|---|---|---|---|
| 2014/0149102 A1 | 5/2014 | Marcu et al. | |
| 2014/0200878 A1* | 7/2014 | Mylonakis | G06F 17/2818 704/4 |
| 2015/0106076 A1* | 4/2015 | Hieber | G06F 17/2827 704/2 |
| 2015/0134336 A1* | 5/2015 | Huang | G06F 17/30654 704/254 |
| 2015/0293910 A1* | 10/2015 | Mathur | G06F 17/30684 704/2 |
| 2016/0132491 A1* | 5/2016 | Watanabe | G06F 17/2818 704/4 |
| 2016/0140111 A1* | 5/2016 | Mirkin | G06F 17/289 704/2 |
| 2016/0203221 A1* | 7/2016 | Rao | G06F 17/30864 707/707 |

OTHER PUBLICATIONS

Senrich, Mixture-Modeling with Unsupervised Clusters for Domain Adaptation in Statistical Machine Translation, 2012, EAMT, pp. 185-192. (Year: 2012).*

Johnson et al., Improving Translation Quality by Discarding Most of the Phrasetable, 2007, ACL, pp. 967-975 (Year: 2007).*

U.S. Appl. No. 14/867,932, filed Sep. 28, 2015, Denkowski, et al. "Optimized Statistical Machine Translation System with Rapid Adaptation Capability", 92 pps.

U.S. Appl. No. 14/868,083, filed Sep. 28, 2015, Goyal, et al. "Optimized Statistical Machine Translation System with Rapid Adaptation Capability", 99 pps.

U.S. Appl. No. 14/868,166, filed Sep. 28, 2015, Denkowski, et al. "Optimized Statistical Machine Translation System with Rapid Adaptation Capability", 88 pps.

Wikipedia article: "k-means clustering" published by Wikipedia, 2016 [online][retrieved on: Jul. 26, 2016] retrieved from: https://en.wikipedia.org/wiki/K-means_clustering, 11 pps.

Web article: "KenLM Language Model Toolkit" published by Kenneth Heafield, 2016 [online][retrieved on: Jul. 26, 2016] retrieved from: https://kheafield.com/code/kenlm/, 3 pps.

Percy Liang bio [online][retrieved on: Jul. 26, 2016] retrieved from: http://cs.stanford.edu/~pliang/, 1 page.

Web article: percyliang / brown-cluster, published by GitHub, Inc. 2016 [online][retrieved on: Jul. 26, 2016] retrieved from: https://github.com/percyliang/brown-cluster, 2 pps.

Web article: "Welcome to Moses!" [online][retrieved on: Jul. 26, 2016] retrieved from: http://www.statmt.org/moses/, 2 pps.

* cited by examiner

MULTI-DOMAIN MACHINE TRANSLATION SYSTEM WITH TRAINING DATA CLUSTERING AND DYNAMIC DOMAIN ADAPTATION

BACKGROUND

Some machine translation systems utilize in-domain language and translation models and out-of-domain language and translation models. In order to build these models, it is typically necessary to have in-domain training data and out-of-domain training data. The determination as to whether available training data is in-domain or out-of-domain is commonly done manually (e.g. by obtaining information regarding the provenance of the in-domain training data) or by experimentation.

It is not unusual, however, for the provenance of the training data to be unknown or unreliable. It is also not unusual for in-domain training data to include out-of-domain training data. As a result, it is not always possible to make an accurate division between in-domain training data and out-of-domain training data. Consequently, the quality of machine translations performed by machine translation systems trained with such data can be negatively impacted.

Additionally, it has also been common practice to train machine translation systems to translate input segments in a particular domain. As a result, in order to translate input segments in many different domains, it has been necessary to build independent machine translation systems, one for each domain to be translated from a source language to a target language. This results in a significant inefficiency in the optimization of the computing resources utilized to implement such machine translation systems.

The disclosure made herein is presented with respect to these and other considerations.

DETAILED DESCRIPTION

Figure 1A:
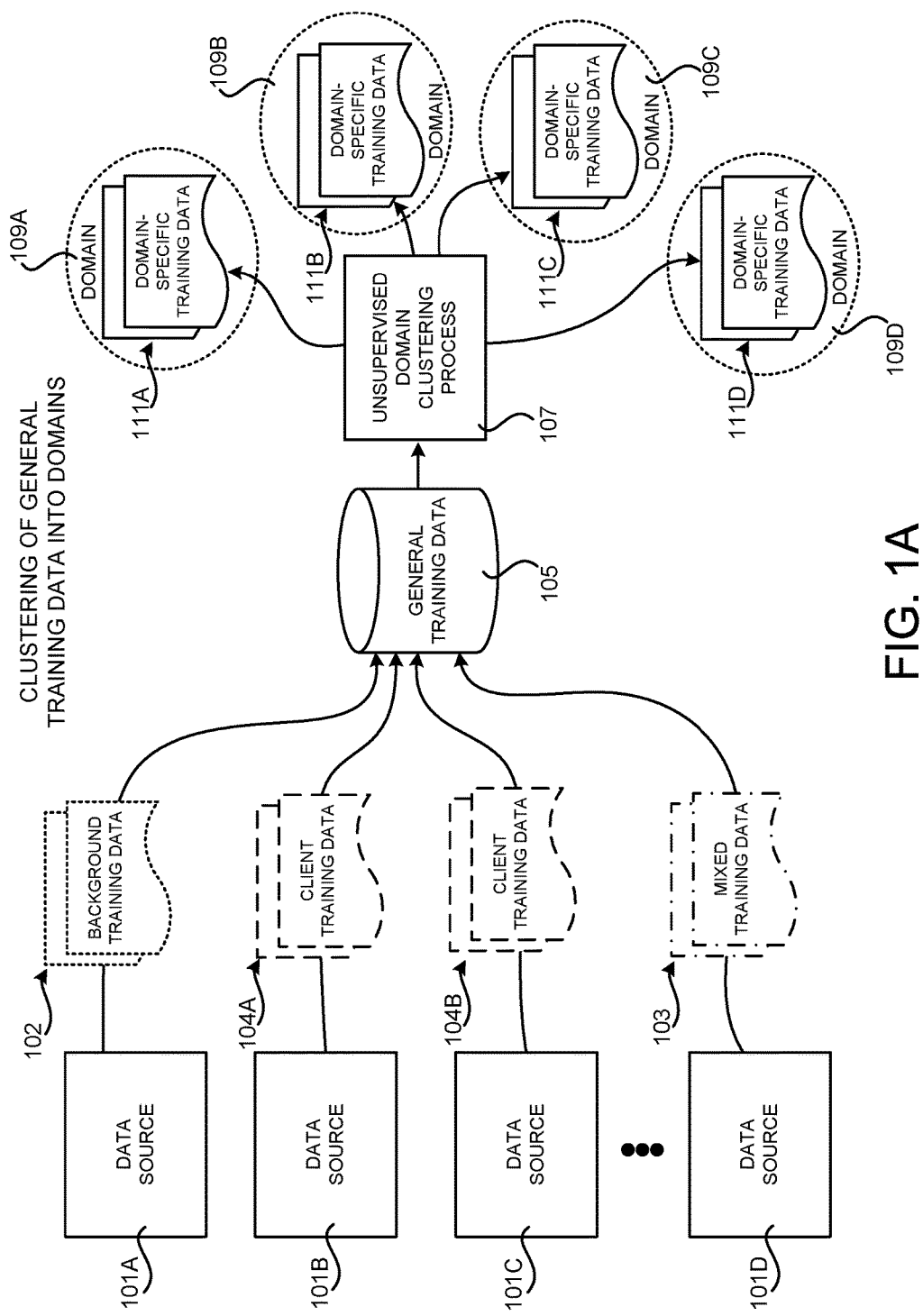
FIG. 1A is a system architecture diagram showing an overview of the configuration and operation of a machine translation system presented herein that is configured for clustering of general training data into domains, according to one particular configuration.

The following detailed description is directed to a multi-domain machine translation system configured to cluster training data and to perform dynamic domain adaptation at translation time on a segment-by-segment basis. Through an implementation of the disclosed technologies, a statistical machine translation system can be provided that can cluster general training data to obviate the need for manually or experimentally dividing the available training data into in-domain and out-of-domain training data. Moreover, by determining the domain-specific model weights that are to be utilized to translate a particular input segment at translation time, a single set of computing resources can be utilized to translate input segments in any domain within a source language to a target language (e.g. English to Spanish). This can significantly increase the scalability and efficiency of machine translation systems that implement the various technologies disclosed herein, without sacrificing (and often improving) translation quality. Additional technical benefits other than those described briefly above can also be realized through an implementation of the technologies disclosed herein.

In order to enable the functionality disclosed herein, a statistical machine translation system is provided that includes functionality for identifying domains within general training data. In particular, an unsupervised domain clustering process receives general training data in one particular configuration. General training data is training data that includes a mix of "background training data" (i.e. out-of-domain training data) and "client training data" (i.e. in-domain training data for one or more domains). In one particular configuration, k-means clustering is utilized to identify the domains in the general training data. Other types of clustering processes can be utilized to identify the domains in the general training data in other configurations. Once the domains in the general training data have been identified, segments in the general training data are assigned to the identified domains. In this way, domain-specific training data can be generated for each of the domains identified in the general training data.

Once the domain-specific training data has been generated for the domains in the general training data, a domain-specific translation model can be generated for each of the domains using the domain-specific training data. Similarly, a domain-specific language model can also be generated for each of the domains using the domain-specific training data. Domain-specific tuning data for each of the domains can then be utilized to learn domain-specific model weights for each of the domains.

Once the domain-specific translation models, domain-specific language models, and domain-specific model weights have been generated, a translation package can be created that includes the domain-specific translation models, the domain-specific language models, and the domain-specific model weights. Other models can also be included in the translation package. The translation package can be implemented as a software container, for instance, that can be utilized to translate input segments in a source language into a target language. Once the translation package has been created, it can be deployed for use in performing translations. For example, and without limitation, the translation package can be deployed to host computers in a service provider network for use by a translation service capable of translating input segments in the source language to the target language.

When a request is received to translate an input segment from the source language to the target language, the domain-specific weights to be utilized to translate the input segment can be determined. For example, an indication of the domain associated with the input segment can be received with the request to translate the input segment. The domain-specific weights associated with the specified domain can then be utilized to translate the input segment. In another configuration, the input segment can be classified into one of the domains at translation time. The domain-specific weights associated with the domain into which the input segment is classified can then be utilized to translate the input segment.

The domain-specific translation models can then be utilized to generate one or more candidate translations for phrases in the input segment. If other translation models are included in the translation package, these translation models can also generate one or more candidate translations for phrases in the input segment. Each of the candidate translations has one or more associated feature scores.

Once the candidate translations have been generated, the domain-specific language models and any other language models, if utilized, can also generate feature scores for the candidate translations. The feature scores can also be weighted to generate weighted feature scores. The weighted feature scores can then be utilized to select a combination of the candidate translations which, when combined, form a translation of the input segment. Additional details regarding the various mechanisms described briefly above will be provided below with regard to FIGS. 1-12.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can also be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1A is a system architecture diagram showing an overview of the configuration and operation of a machine translation system presented herein that is configured for clustering of general training data into domains, according to one particular configuration. As shown in FIG. 1A, a number of data sources 101A-101D (which might be referred to herein collectively as "the data sources 101" or individually as "a data source 101) can provide various types of training data for use in machine translation. The training data is text that is expressed in both a source language (e.g. English) and a target language (e.g. Spanish).

As also shown in FIG. 1A, the training data can be background training data 102 (i.e. training data that is not specific to any particular domain), client training data 104A and 104B (i.e. training data that is specific to a particular domain), or mixed training data 103 (i.e. training data that includes both background training data 102 and client training data 104). The background training data 102, client training data 104A and 104B, and mixed training data 103 can be pooled, thereby creating general training data 105. Accordingly, the general training data includes a mix of "background training data" (i.e. out-of-domain training data) and "client training data" (i.e. in-domain training data for one or more domains).

As further shown in FIG. 1A, an unsupervised domain clustering process 107 receives the general training data 105 in one particular configuration. The unsupervised domain clustering process 107 identifies the domains 109A-109D (which might be referred to collectively as "the domains 109" or individually as "a domain 109") in the general training data 105. In the example shown in FIG. 1A, for instance, four domains 109 have been identified. In other examples, greater or fewer domains 109 can be identified in the general training data 105.

In one particular configuration, the unsupervised domain clustering process 107 implements k-means clustering in order to identify the domains 109 in the general training data 105. As known to those skilled in the art, k-means clustering is a method of vector quantization that is popular for cluster analysis in data mining. K-means clustering aims to partition N observations into K clusters in which each observation belongs to the cluster with the nearest mean, serving as a prototype of the cluster. In this regard, it is to be appreciated that other types of clustering mechanisms can be utilized to identify the domains 109 in the general training data 105 in other configurations such as, but not limited to, neural modeling or neural networks.

Once the domains 109 in the general training data 105 have been identified, the unsupervised domain clustering process 107 assigns segments in the general training data 105 to the identified domains 109. In this way, domain-specific training data 111A-111D can be generated for each of the domains 109A-109D, respectively, identified in the general training data 105. In the example shown in FIG. 1A, for instance, the domain-specific training data 111A corresponds to the domain 109A, the domain-specific training data 111B corresponds to the domain 109B, the domain-specific training data 111C corresponds to the domain 109C, and the domain-specific training data 111D corresponds to the domain 109D.

As will be described in greater detail below, the domain-specific training data 111 can be utilized to create domain-specific translation models, domain-specific language models, and domain-specific model weights (not shown in FIG. 1) for each of the domains 109. The domain-specific translation models, domain-specific language models, and domain-specific model weights can then be utilized to translate input segments in the source language to the target language.

Figure 1B:
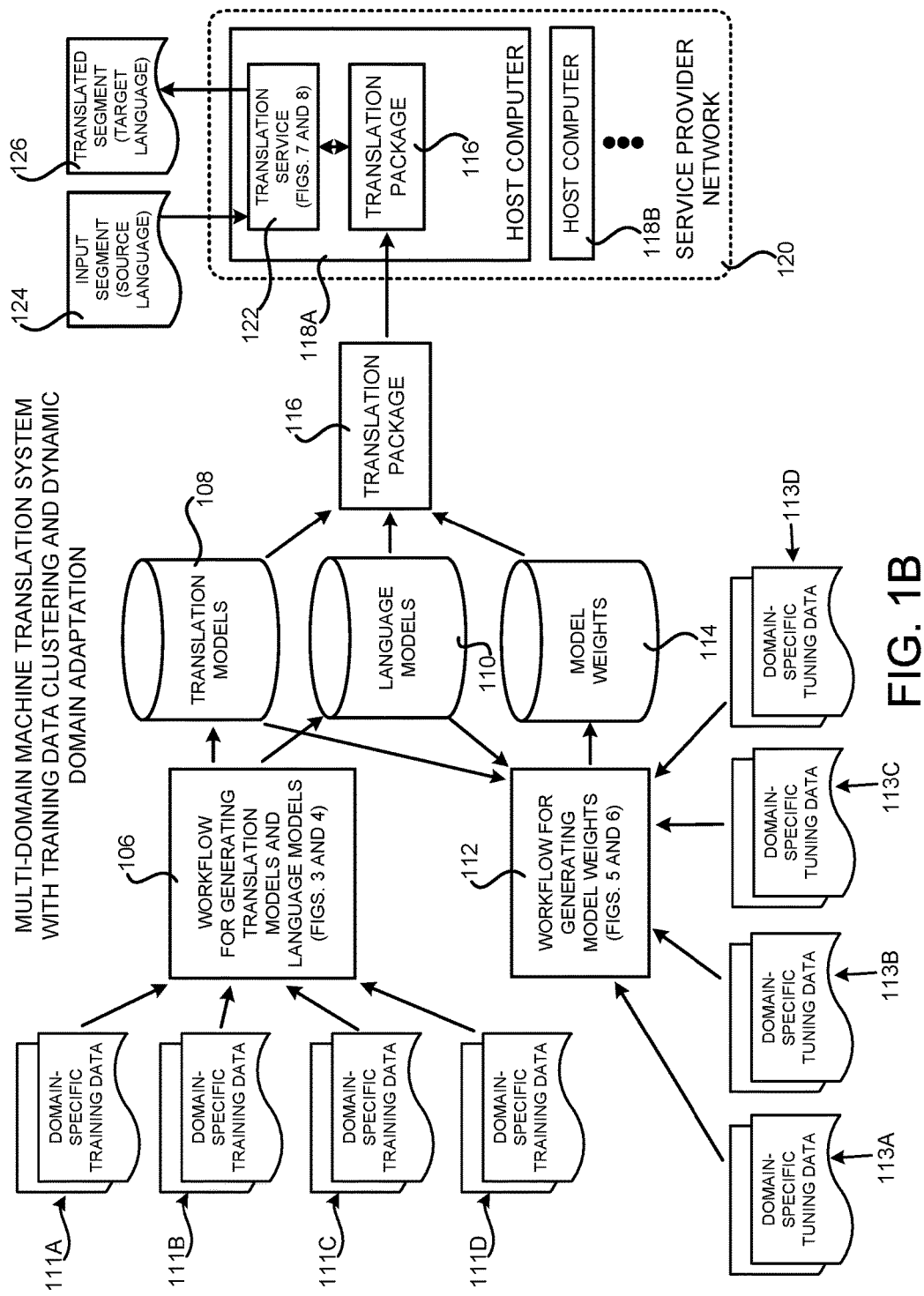
FIG. 1B is a system architecture diagram showing an overview of the configuration and operation of a machine translation system presented herein that is configured with dynamic domain adaptation capabilities, according to one configuration disclosed herein.

FIG. 1B is a system architecture diagram showing an overview of the configuration and operation of a multi-domain machine translation system configured to cluster training data and to perform dynamic domain adaptation at translation time on a segment-by-segment basis, according to one configuration disclosed herein. As discussed briefly above, the system described herein can be utilized to create a translation package 116 that can be utilized by a translation service 122 to translate an input segment 124, or segments, expressed in a source language (e.g. English) to a translated segment 126, or segments, in a target language (e.g. Spanish).

In order to generate the translation package 116, a workflow 106 is performed for generating domain-specific translation models 108 for the source and target languages, and for generating domain-specific language models 110 for the target language. The workflow 106 takes the domain-specific training data 111A-111D for each of the domains 109A-109D, respectively, as input. As shown in FIG. 1, the output of the workflow 106 is one or more domain-specific translation models 108 for translating between the source and target languages, and one or more domain-specific language models 110 for the target language. Additional details regarding the workflow 106 for generating the domain-specific translation models 108 and the domain-specific language models 110 are provided below with regard to FIGS. 3 and 4.

In order to generate the translation package 116, a workflow 112 is also executed for generating domain-specific model weights 114 for the domain-specific translation models 108 and the domain-specific language models 110. In one configuration, the margin relaxed infused algorithm ("MIRA") is utilized to perform the large-scale discriminative training. Other algorithms can also be utilized in other configurations.

As illustrated in FIG. 1, the workflow 112 takes as input additional domain-specific tuning data 113A-113D, which corresponds to each of the domains 109A-109D, respectively. The additional domain-specific tuning data 113 can include sentences, paragraphs, or other phrases in the source and target languages that were not included in the domain-specific training data 111A-111D. Additionally, the additional domain-specific tuning data 113 can include text of a type that is similar to the input segments 124 that will be encountered during production use of the machine translation system shown in FIG. 1B. Additional details regarding the generation of the domain-specific model weights 114 will be provided below with regard to FIGS. 5 and 6.

In some configurations, it is not necessary to obtain additional domain-specific tuning data 113 in order to generate the domain-specific model weights 114. In this configuration, the domain-specific tuning data 113 is extracted from the domain-specific training data 111 for each of the domains 109. The extracted tuning data can then be utilized to learn domain-specific model weights 114 for translating input segments 124 that are similar to the segments in each of the domains 109. In this manner, it is not necessary to obtain additional domain-specific tuning data 113 for each of the domains 109. Moreover, and as described herein, the domain-specific model weights 114 can then be utilized at translation time to translate input segments 124 in each domain 109, respectively.

Once the domain-specific model weights 114 have been generated, the domain-specific translation models 108, the domain-specific language models 110, and the domain-specific model weights 114 are added to the translation package 116. The translation package 116 can then be deployed to one or more host computers 118A-118B in a service provider network 120 in one particular configuration.

The service provider network 120 is a computing network configured to provide computing resources on a permanent or an as-needed basis. Among other types of functionality, the computing resources provided by the service provider network 120 can be utilized to implement the various network services described herein, such as the translation service 122. The computing resources provided by the service provider network 120 can include various types of computing resources, such as data processing resources like virtual machine ("VM") instances, data storage resources, networking resources, data communication resources, network services, and the like.

A customer or potential customer of the service provider network 120 can utilize an appropriate computing system (not shown in FIG. 1) to communicate with the service provider network 120 over an appropriate data communications network (also not shown in FIG. 1). In this way, a customer of the service provider network 120 can configure various aspects of the operation of the computing resources provided by the service provider network 120, or to otherwise control any computing resources being utilized by the customer.

For example, and without limitation, a computing system utilized by a customer of the service provider network 120 can be utilized to purchase computing resources in the service provider network 120, to configure aspects of the operation of the computing resources through a management console (not shown in FIG. 1) or other type of interface, to access and utilize functionality provided by the various services and systems described herein, and/or to perform other types of functionality with regard to the operation of the computing resources provided by the service provider network 120. Additional details regarding the configuration and operation of the service provider network 120 will be provided below with regard to FIGS. 9-12. In this regard, it should be appreciated that the service provider network 120 represents but one operating environment for the technologies disclosed herein and that other computing environments can be utilized to implement the statistical machine translation system disclosed herein.

As discussed briefly above, the service provider network 120 can also be configured to execute various types of network services. For example, and without limitation, the service provider network 120 can execute the translation service 122 shown in FIG. 1. As discussed briefly above, the translation service 122 is a network service that executes in the service provider network 120 in one particular configuration. The translation service 122 exposes an interface, such as a Web services interface, through which callers can request translation of an input segment 124 in a source language to a translated segment 126 in a target language. In response to receiving such a request, the translation service 122 is configured to utilize the domain-specific translation models 108, the domain-specific language models 110, and the domain-specific model weights 114 contained in the translation package 116 to perform the requested translation. Additional details regarding the operation of the translation service 122 will be provided below with regard to FIGS. 7 and 8.

It should be appreciated that the workflows 106 and 112 are implemented in one particular configuration utilizing the open-source DUCTTAPE workflow management system. Additional software components can then be utilized to encapsulate the resulting domain-specific language models 110, domain-specific translation models 108, domain-specific model weights 114, and other components into a translation package 116, such as a software container, that can be deployed into a production environment, such as the service provider network 120. Once deployed, the translation package 116 can be utilized to respond to translation requests received from service clients.

It should also be appreciated that the various models shown in FIG. 1B are merely illustrative and that other models and their associated model weights can be utilized in a similar manner to that described herein. For example, and without limitation, one or more reordering models (not shown in FIG. 1) are also utilized in some configurations. Other configurations can also be utilized without departing from the spirit and scope of the disclosure presented herein.

Figure 2:
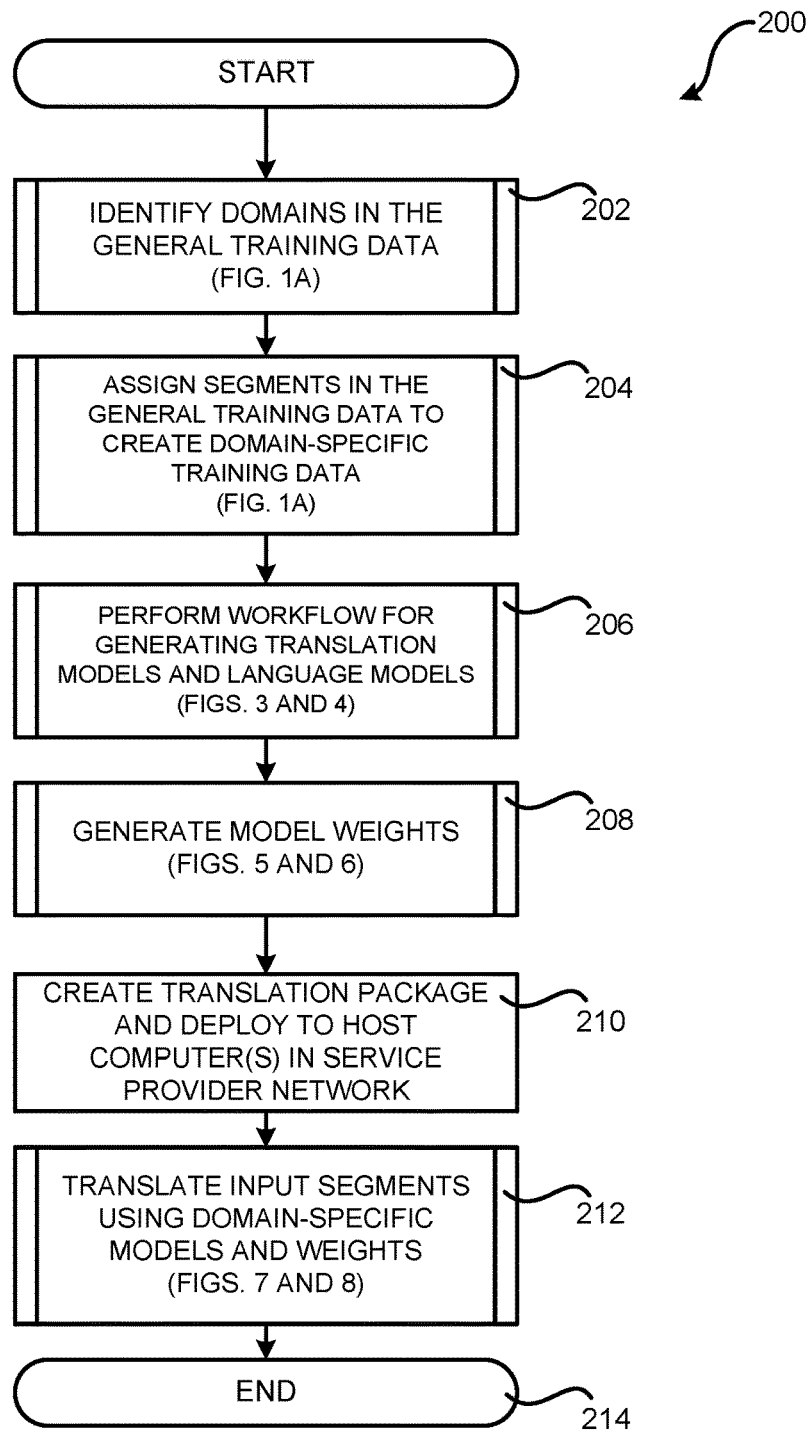
FIG. 2 is a flow diagram showing a routine that illustrates further aspects of the operation of the machine translation system shown in FIG. 1B, according to one particular configuration disclosed herein.

FIG. 2 is a flow diagram showing a routine 200 that illustrates further aspects of the operation of the machine translation system shown in FIG. 1, according to one particular configuration disclosed herein. It should be appreciated that the logical operations described herein with respect to FIG. 2, and the other FIGS., can be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special-purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 200 begins at operation 202, where the domains 109 in the general training data 105 are identified in the manner described above with regard to FIG. 1A. As discussed above, an unsupervised domain clustering process 107 is utilized to identify the domains 109 in the general training data 105 in one particular configuration. From operation 202, the routine 200 proceeds to operation 204, where the unsupervised domain clustering process 107 assigns text segments in the general training data 105 to each of the domains 109, thereby creating domain-specific training data 111 for each of the domains 109.

The routine 200 then proceeds from operation 204 to operation 206, where the workflow 106 is performed for generating the domain-specific translation models 108 and the domain-specific language models 110. Additional details regarding the workflow 106 will be provided below with regard to FIGS. 3 and 4. From operation 206, the routine 200 proceeds to operation 208, where the workflow 112 is performed for generating the domain-specific model weights 114 for the domain-specific translation models 108 and the domain-specific language models 110. Additional details regarding this process will be provided below with regard to FIGS. 5 and 6.

From operation 208, the routine 200 proceeds to operation 210, where the domain-specific translation models 108, the domain-specific language models 110, the domain-specific model weights 114 are added to the translation package 116. The translation package 116 can then be deployed, such as to a host computer 118 in the service provider network 120 for example. Once the translation package 116 has been deployed, the translation service 122 can utilize the domain-specific translation models 108, domain-specific language models 110, and domain-specific model weights 114 in the translation package 116 to translate input segments 124 at operation 212. Additional details regarding the contents and use of the translation package 116 will be provided below with regard to FIGS. 7 and 8. The routine 200 then proceeds from operation 212 to operation 214, where it ends.

Figure 3:
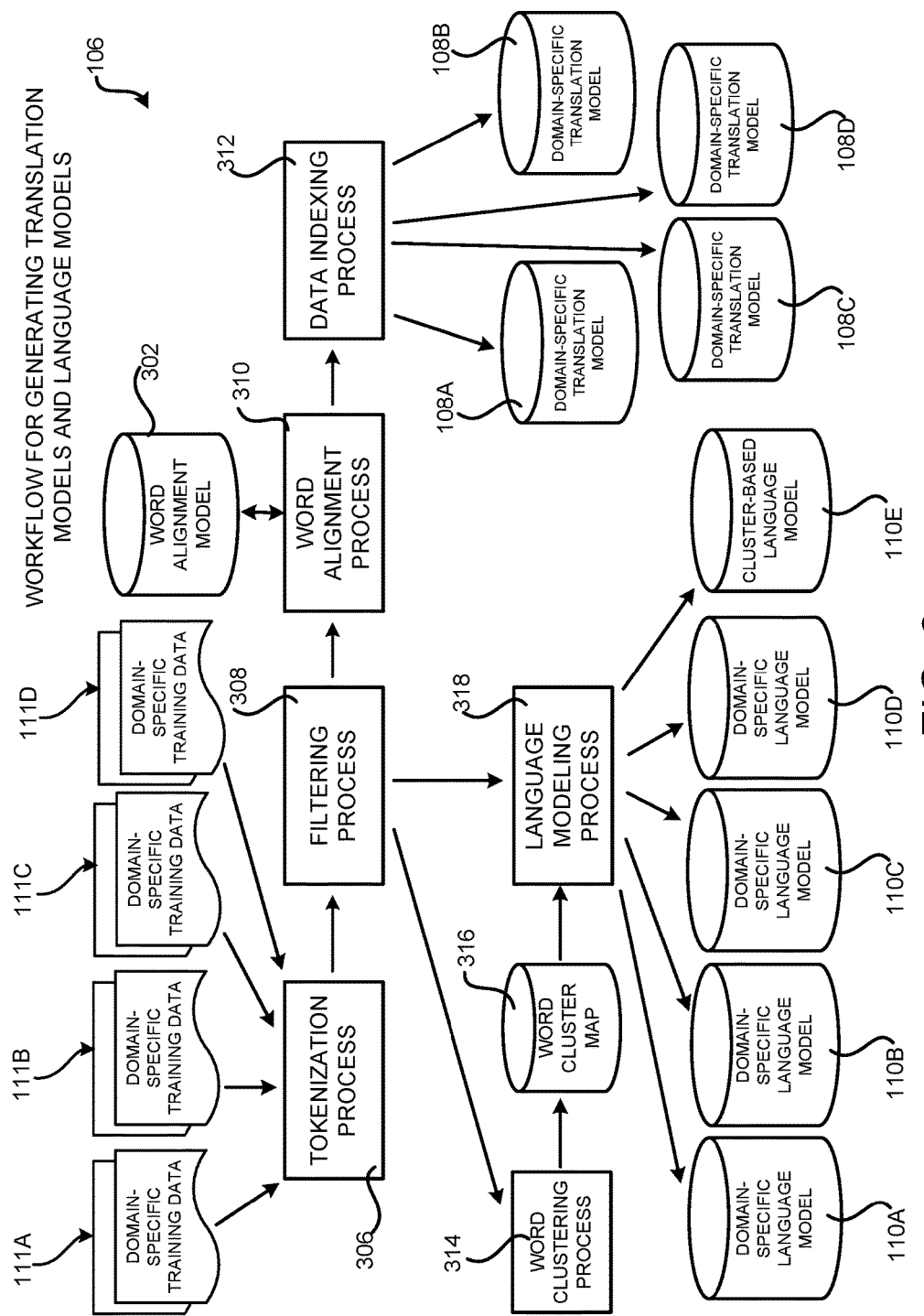
FIG. 3 is a system architecture diagram showing aspects of the operation of the machine translation system shown in FIG. 1B for generating domain-specific translation models and domain-specific language models, according to one configuration disclosed herein.

FIG. 3 is a system architecture diagram showing aspects of the operation of the workflow 106 shown in FIG. 1B for generating the domain-specific translation models 108 and the domain-specific language models 110, according to one configuration disclosed herein. As discussed briefly above, the workflow 106 takes as input the domain-specific training data 111A-111D. As discussed above, the domain-specific training data 111A-111D corresponds to each of the domains 109 identified in the general training data 105.

The first step of the workflow 106 illustrated in FIG. 3 is the tokenization process 306. The tokenization process 306 tokenizes the domains-specific training data 111 by breaking the text contained therein into discrete units. For example, and without limitation, the tokenization process 306 can separate punctuation characters, perform normalization on the text, and break apart contractions. The tokenized domain-specific training data 111 is then provided to the filtering process 308.

The filtering process 308 removes text from the tokenized domain-specific training data 111 that is not suitable for inclusion in the domain-specific translation models 108 or for use in training the domain-specific language models 110. For example, and without limitation, the filtering process 308 can remove very long sentences that are not useful for creating the language models 110. Similarly, the filtering process 308 can remove mismatched sentences that are not appropriate for use in the domain-specific translation models 108. Other types of filtering can be performed. The tokenized and filtered domain-specific training data 111 is then provided to the word alignment process 310. The tokenized and filtered domain-specific training data 111 in the target language is also provided to the language modeling process 318 and the word clustering process 314. Each of these processes is described in detail below.

The word alignment process 310 utilizes unsupervised machine learning to learn a word alignment model 302 describing word-level correspondences between the domain specific training data 111 in the source language and the domain-specific training data 111 in the target language. For example, and without limitation, the word alignment process 310 can learn word-level correspondences between the domain-specific training data 111 in the source language and the domain-specific training data 111 in the target language. The tokenized, filtered, and word-aligned domain-specific training data 111 is then provided to the data indexing process 312.

The data indexing process 312 indexes the tokenized, filtered, and word-aligned background training data 102 to create a domain-specific translation model 108A-108D for each of the domains 109A-109D, respectively. The indexed domain-specific training data 111A-111D stored each domain-specific translation model 108A-108D, respectively, can be searched at translation time to generate candidate translations of phrases in an input segment 124. In one particular implementation, the domain-specific translation models 108 are implemented utilizing suffix array data structures. Other data structures can be utilized in other configurations to index the domain-specific training data 102 in a manner suitable for efficient searching at translation time.

As discussed briefly above, the tokenized and filtered domain-specific training data 111A-111D in the target language is also provided to the language modeling process 318. The language modeling process 318 utilizes the domain-specific training data 111A-11D to generate a domain-specific language model 110A-110D, respectively, for each domain 109 in the target language. As will be described in greater detail below, the domain-specific language models 110 can generate feature scores for different attributes of the translations generated by the statistical machine translation system described herein.

As also discussed briefly above, the tokenized and filtered domain-specific training data 111 in the target language is also provided to the word clustering process 314 in one particular configuration. The word clustering process 314 first creates a word cluster map 316 by assigning each word in the target language to a cluster, a group of words that occur in similar contexts. In one particular implementation, for example, the Brown clustering algorithm is utilized to cluster the words in the tokenized and filtered domain-specific training data 111 in the target language. As known to those skilled in the art, Brown clustering is an agglomerative, bottom-up form of clustering that groups words into a binary tree of classes using a merging criterion based on the log-probability of a text under a class-based language model (i.e. a probability model that takes the clustering into account). Details regarding one particular implementation of the Brown hierarchical word clustering algorithm in the C++ programming language can be found at http://cs.stanford.edu/~pliang/and https://github.com/percyliang/brown-cluster, both of which are incorporated herein by reference in their entirety.

Using the Brown clustering algorithm, monolingual text can be examined to identify words that tend to be used in the same way and appear in the same context. These words can then be mapped to the same cluster. The words in the domain-specific training data 111 in the target language can then be replaced by unique cluster identifiers ("IDs") for the clusters they have been mapped to. A language model can then be built over the sequences of cluster IDs, as described in greater detail below.

Once the word cluster map 316 has been established, a statistical cluster-based language model 110E is trained by mapping the target-language words in the domain-specific training data 111 to a cluster. As discussed above, the cluster-based language model 110E is then trained on the resulting cluster sequences. In one particular implementation, the cluster-based language model 110C is generated using the open-source KENLM language model generating tool. Additional details regarding the KENLM language model generating tool can be found at https://kheafield.com/code/kenlm/.

It should be appreciated that other language model generation tools or toolkits can be utilized in other configurations. In this regard, it should also be appreciated that while a single cluster-based language model 110E is shown in FIG. 3, multiple cluster-based language models can be utilized in other configurations. For example, separate cluster-based language models can be generated for each of the domains 109. Other configurations can also be utilized. In this regard, it should also be appreciated that the open-source KENLM language model generating tool can also be utilized to generate the other language models described herein. Other language model generating tools and toolkits can also be utilized in other configurations.

Figure 4:
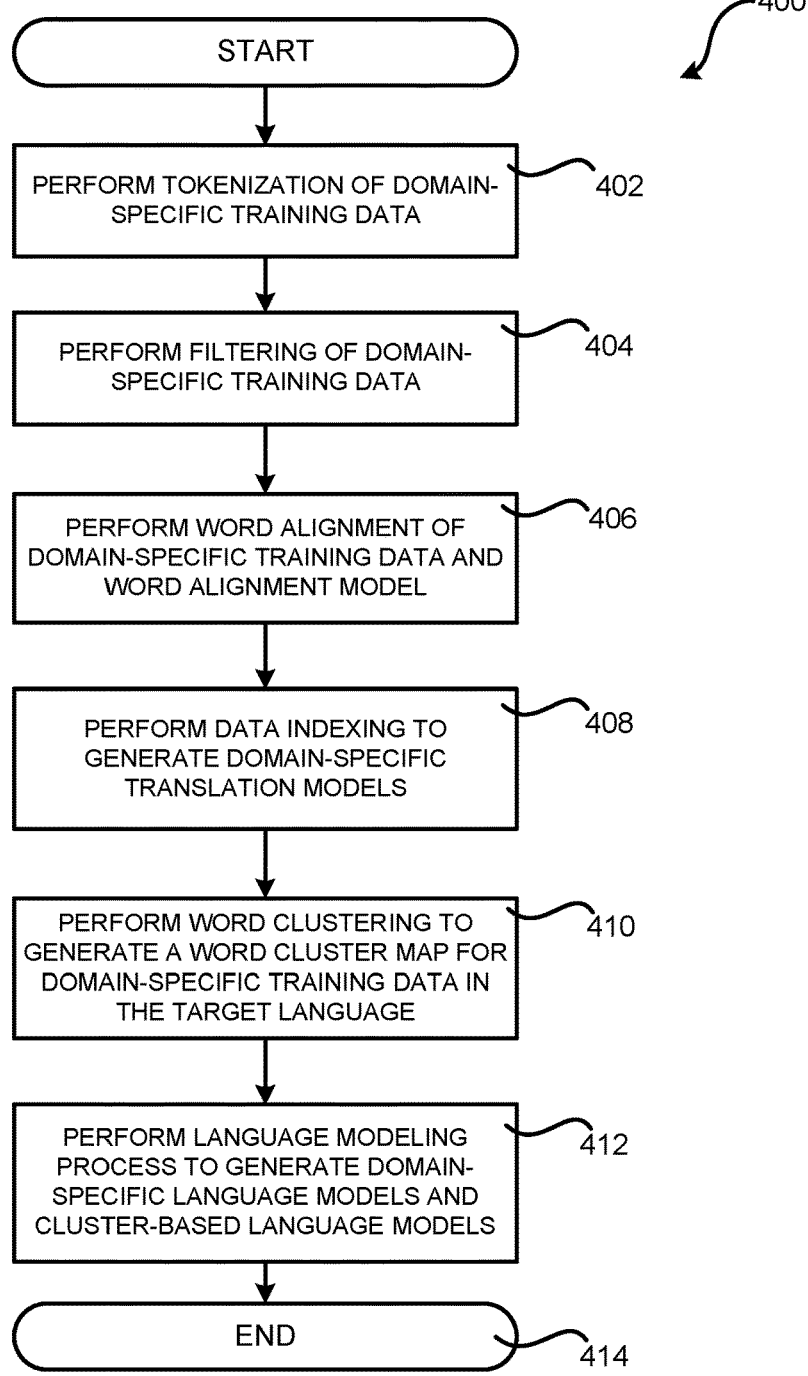
FIG. 4 is a flow diagram showing a routine that illustrates aspects of the operation of the machine translation system shown in FIG. 1B for generating domain-specific translation models and domain-specific language models, according to one configuration disclosed herein.

FIG. 4 is a flow diagram showing a routine 400 that illustrates aspects of the operation of the workflow 106 illustrated in detail in FIG. 3 for generating domain-specific translation models 108 and domain-specific language models 110, according to one configuration disclosed herein. The routine 400 begins at operation 402, where the tokenization process 306 is performed on the domain-specific training data 111. The routine 400 then proceeds from operation 402 to operation 404, where the filtering process 308 is performed on the tokenized domain-specific training data 111. The routine 400 then proceeds from operation 404 to operation 406.

At operation 406, the word alignment process 310 is performed in order to word align the tokenized and filtered domain-specific training data 111. Additionally, and as discussed above, the word alignment model 302 is learned at operation 406. From operation 406, the routine 400 proceeds to operation 408.

At operation 408, the data indexing process 312 described above is performed to create the domain-specific translation models 108A-108D, one for each of the domains 109. From operation 408, the routine 400 proceeds to operation 410, where the word clustering process 314 is performed in order to generate the word cluster map 316. Once the word cluster map 316 has been generated, the routine 400 proceeds from operation 410 to operation 412, where the language modeling process 318 utilizes the domain-specific training data 111 in the target language to generate the domain-specific language models 110. The language modeling process 318 also utilizes the word cluster map 316 to generate the cluster-based language model 110E. The routine 400 then proceeds from operation 412 to operation 414, where it ends.

Figure 5:
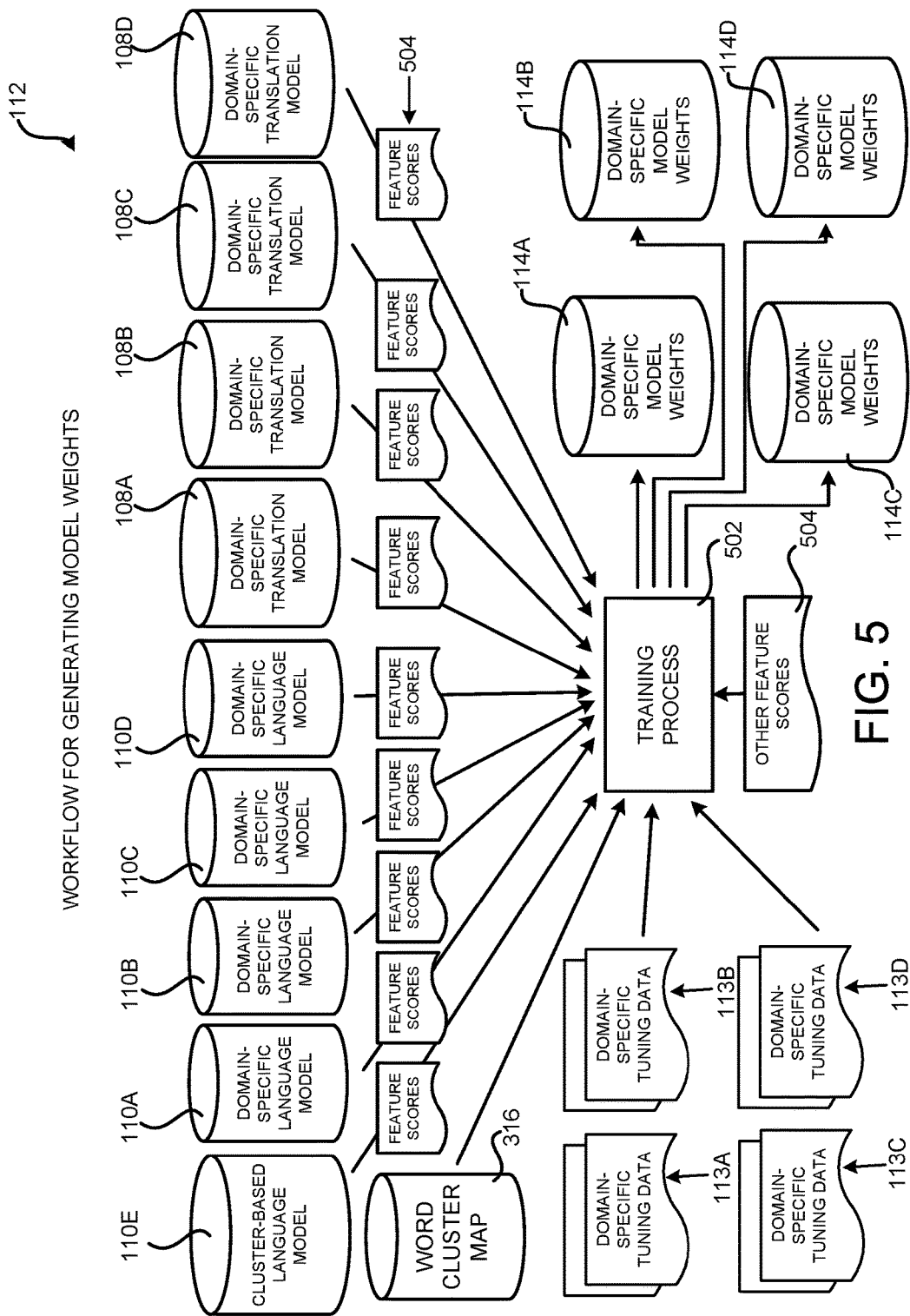
FIG. 5 is a system architecture diagram showing aspects of the operation of the machine translation system shown in FIG. 1B for generating model weights, according to one configuration disclosed herein.

FIG. 5 is a system architecture diagram showing aspects of the operation of the workflow 112 shown in FIG. 1B for generating domain-specific model weights 114, according to one configuration disclosed herein. As discussed briefly above, the cluster-based language model 110E, the domain-specific translation models 108A-108D, and the domain-specific language models 110A-110D can generate feature scores 504 for candidate translations of phrases in the input segments 124 at translation time. As discussed above, the feature scores 504 indicate how likely a translation is based upon the data that the model utilized to perform the translation was trained upon. Each of the various language and translation models can generate multiple feature scores. Additionally, the feature scores 504 can also include other statistical measures generated by the statistical machine translation system disclosed herein.

Due to the large number of feature scores 504 that are generated by the multiple translation and language models, the traditional line search approach to machine translation system optimization is insufficient. In order to address this consideration, and potentially others, the statistical machine translation system disclosed can utilize a large-scale discriminative training process 502 to generate optimized domain-specific model weights 114 for the various feature scores 504. As mentioned above, in one configuration the MIRA algorithm is utilized to implement the training process 502. Other algorithms can also be utilized in other configurations.

As illustrated in FIG. 5, the large-scale discriminative training process 502 takes additional domain-specific tuning data 113A-113D corresponding to each of the domains 109 respectively, as input. As mentioned above, the additional domain-specific tuning data 113 can include sentences, paragraphs, or other phrases in the source and target languages that were not included in the domain-specific training data 111. Additionally, the additional domain-specific training data 113 can include text of a type that is similar to the input segments 124 that will be encountered during production use of the machine translation system shown in FIG. 1B.

The large-scale discriminative training process 502 utilizes the additional domain-specific tuning data 113A-113D and the feature scores 504 generated by the various translation and language models to optimize domain-specific model weights 114A-114D, respectively. For example, and without limitation, the domain-specific tuning data 113A can be utilized to generate the domain-specific model weights 114A, the domain-specific tuning data 113B can be utilized to generate the domain-specific model weights 114B, the domain-specific tuning data 113C can be utilized to generate the domain-specific model weights 114C, the domain-specific tuning data 113D can be utilized to generate the domain-specific model weights 114D. The large-scale discriminative training process 502 also utilizes the word cluster map 316 to map the additional domain-specific tuning data 113 in the target language into clusters. Once the model weights 114A-114D have been generated, they can then be applied to feature scores 504 for phrases in the candidate translations at translation time in the manner described below.

Figure 6:
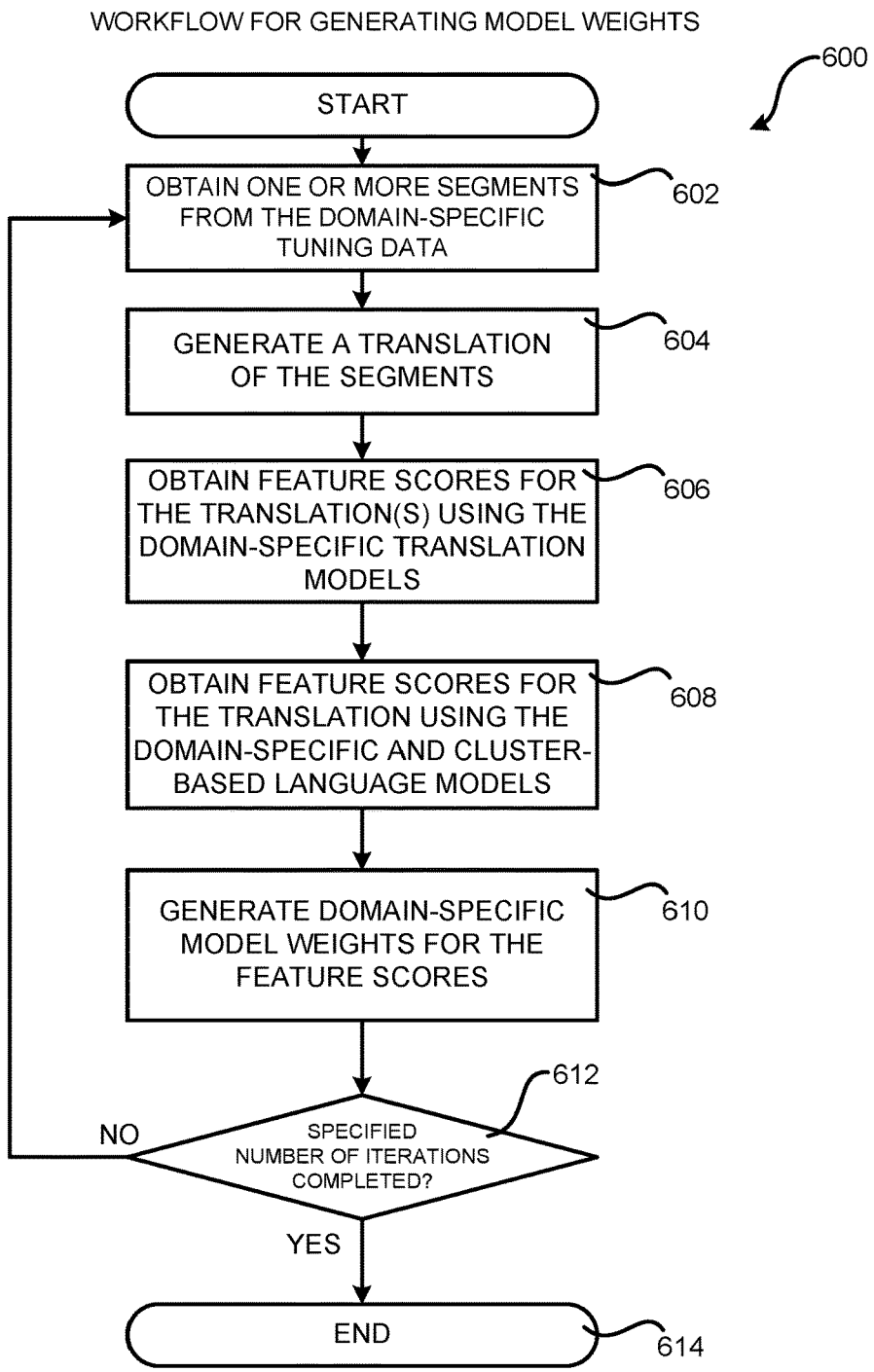
FIG. 6 is a flow diagram showing a routine that illustrates aspects of the operation of the machine translation system shown in FIG. 1B for generating model weights, according to one configuration disclosed herein.

FIG. 6 is a flow diagram showing a routine 600 that illustrates aspects of the operation of the workflow 112 shown in detail in FIG. 5 for using large-scale discriminative training to generate domain-specific model weights 114 for the domains 119, according to one configuration disclosed herein. The routine 600 begins at operation 602, where one or more text segments in the source language are obtained from the additional domain-specific tuning data 113. The routine 600 then proceeds from operation 602 to operation 604, where the statistical machine translation system described herein is utilized to generate a translation of the segment, or segments, obtained at operation 602. Additional details regarding the manner in which translation is performed are provided below with regard to FIGS. 7 and 8.

From operation 604, the routine 600 proceeds to operation 606, where feature scores 504 are obtained for the translation from the domain-specific translation models 108A-108D. Feature scores 504 can also be obtained from other translation models if utilized. From operation 606, the routine 600 proceeds to operation 608, where feature scores 504 are obtained from the domain-specific translation models and, if utilized, the cluster-based language model 110E. Feature scores 504 can also be obtained from other language models if utilized. For example, although not illustrated in FIG. 5, feature scores 504 can also be obtained from a combined language model in some configurations. As discussed above, feature scores 504 can also be obtained from other sources, including statistical measures obtained during translation.

From operation 608, the routine 600 proceeds to operation 610, where the domain-specific model weights 114 are generated or adjusted utilizing the MIRA algorithm in one specific configuration. For example, and without limitation, the domain-specific model weights 114 can be adjusted such that the disclosed statistical machine translation system generates a translated segment 126 for an input segment 124 that is as close as possible to a reference translation.

From operation 610, the routine 600 proceeds to operation 612, where a determination is made as to whether a predetermined number of iterations have been performed. If the specified number of iterations have not been performed, the routine 600 proceeds back to operation 602, where another iteration of the routine 600 can be performed. If, however, the specified number of iterations have been performed, the routine 600 proceeds from operation 612 to operation 614, where it ends. It is to be appreciated that the routine 600 shown in FIG. 6 can be repeated for each instance of domain-specific training data 113 to generate a set of domain-specific model weights 114 for a particular domain.

Figure 7:
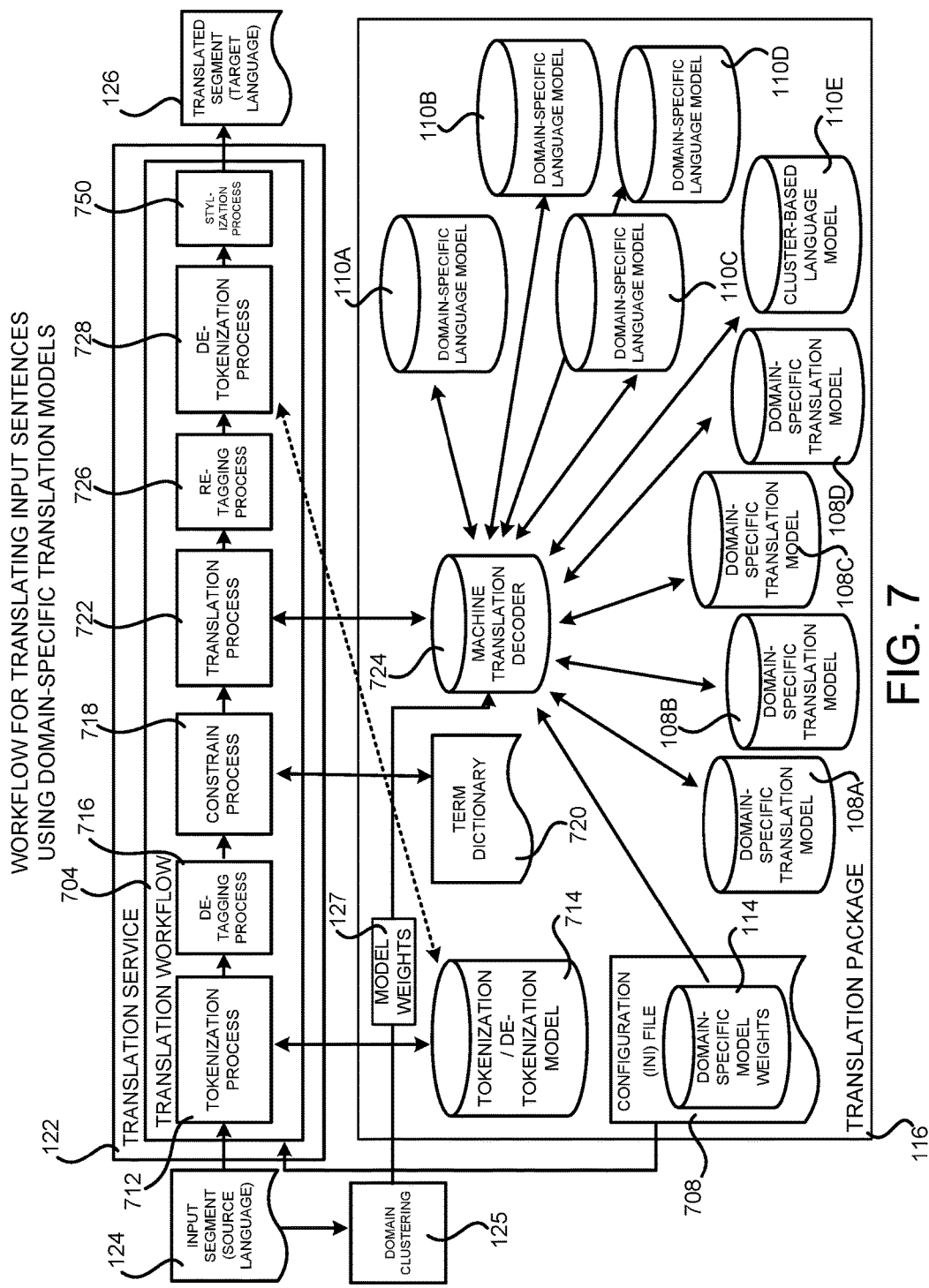
FIG. 7 is a system architecture diagram showing aspects of the operation of the machine translation system shown in FIG. 1B for translating input segments using domain-specific translation and language models, according to one configuration disclosed herein.

FIG. 7 is a system architecture diagram showing aspects of the operation of the machine translation system shown in FIG. 1B for translating input segments 124 using the domain-specific translation models 108, domain-specific language models 110 and, if utilized, the cluster-based language model 110E, according to one configuration disclosed herein. As discussed briefly above, the translation package 116 is deployed to the service provider network 120 for use by the translation service 122 in one particular configuration. As illustrated in FIG. 7, the translation package includes the domain-specific language models 110A-110D for each of the domains 109 and the cluster-based language model 110E, if utilized.

The translation package 116 also includes the domain-specific translation models 108 for each of the domains 109. The translation package 116 can also include a configuration file 708 that includes the domain-specific model weights 114. The configuration file 708 can also specify other preferences regarding the manner in which translations are to be performed.

In some configurations, the translation package 116 also includes a tokenization/de-tokenization model 714. The tokenization/de-tokenization model 714 can be generated by the tokenization process 306 described above and utilized at translation time to tokenize and/or de-tokenize an input segment 124 that is to be translated. The translation package 116 can also include a term dictionary 720 that includes translations for domain-specific words or phrases. As discussed in greater detail below, the term dictionary 720 can be utilized to ensure that specified words or phrases are translated in the same manner regardless of the context within which they appear.

The translation package 116 also includes a machine translation decoder 724. In one particular configuration, the machine translation decoder 724 is the MOSES open-source statistical machine translation system. Other statistical machine translation decoders can be utilized in other configurations. The configuration file 708 can include data for configuring the machine translation decoder 724 in various ways. Additional details regarding the MOSES open-source statistical machine translation system can be found at http://www.statmt.org/moses/.

As shown in FIG. 7 and described briefly above, the translation service 122 can utilize the translation package 116 when translating an input segment 124 in a source language to a translated segment 126 in a target language. In particular, the translation service 122 is configured in some implementations to implement a translation workflow 704 in order to perform the translation. The configuration file 708 can include data that specifies various aspects regarding the operation of the translation workflow 704.

The translation workflow 704 begins with the tokenization process 712. The tokenization process 712 that is performed at translation time is similar to the tokenization process 306 described above. In particular, the tokenization process 712 tokenizes the input segment 124 by breaking the text into discrete units. For example, and without limitation, the tokenization process 712 can separate punctuation characters, perform normalization on the text, and break apart contractions. As mentioned above, the tokenization/de-tokenization model 714 can be generated by the tokenization process 306 and utilized by the tokenization process 712 and utilized at translation time. The tokenization/de-tokenization model 714 can also be the same as the tokenization process 306.

The tokenization process 712 provides the tokenized input segment 124 to the de-tagging process 704. The de-tagging process 704 removes any markup tags (e.g. HTML tags) that appear in the input segment 124. As will be described in greater detail below, the removed markup tags can be added to the translated segment 126 by the re-tagging process 726. In this manner, formatting contained in the input segment 124 can be preserved in the translated segment 126.

The tokenized and de-tagged input segment 124 is provided to the constrain process 718 in one configuration. The constrain process 718 utilizes the term dictionary 720 to translate specified words or phrases identified in the term dictionary 720. As mentioned above, this enables a specific translation of a word or phrase to be performed regardless of the context in which the word or phrase appears. Other types of constraints can also be utilized in other configurations instead of or in addition to the term dictionary 720.

The next step in the translation workflow 704 is the translation process 722. The translation process 722 utilizes the machine translation decoder 724 to translate the input segment 124 into the target language. In this regard, the machine translation decoder 724 can utilize the domain-specific translation models 108A-108D to translate the input segment 124 to one or more candidate translations of the input segment 124 in the target language.

As also mentioned above, the translation models 108 can provide various feature scores 504 for the candidate translations. Similarly, the machine translation decoder 724 can utilize the domain-specific language models 110A-110D and the cluster-based language model 110C, if utilized, to also generate feature scores 504 for the candidate translations.

The domain-specific model weights 114 can then be utilized to weight the various contributions from the language models 110 and the translation models 108. The weighted feature scores can then be utilized to combine various candidate translations to form a translation of the input segment 124.

As discussed briefly above, in one particular configuration, the domain-specific weights to be utilized to translate the input segment can be determined 124 can be determined when a request is received to translate an input segment 124 from the source language to the target language. For example, and without limitation, an indication of the domain 109 associated with the input segment 124 can be received with the request to translate the input segment 124. The domain-specific model weights 114 associated with the specified domain 109 can then be utilized to translate the input segment 124.

In another configuration, a domain clustering process 125 can be used to classify the input segment 124 as belonging to one of the domains 109 at translation time. An indication 127 of domain 109 or the domain-specific model weights 114 to be utilized to translate the input segment 124 can then be provided to the machine translation decoder 724. The domain-specific model weights 114 associated with the domain 109 into which the input segment 124 is classified can then be utilized by the machine translation decoder 724 to translate the input segment 124. The domain clustering process 115 used at translation time can be the same or different than the unsupervised domain clustering process 107 utilized to generate the domain-specific training data 111.

As mentioned briefly above, the re-tagging process 726 can then be performed to re-apply any formatting removed from the input segment 124 by the de-tagging process 704. Subsequently, the de-tokenization process 728 can utilize the tokenization/de-tokenization model 714 to de-tokenize the translated segment 126. For example, and without limitation, the de-tokenization process 728 can attach punctuation to the translated segment 126 that was separated by the tokenization process 712. As another example, the de-tokenization process 728 can merge contractions that were broken apart by the tokenization process 712. The de-tokenization process 728 can also perform other functionality not specifically mentioned herein.

In one configuration, a stylization process 750 is also performed as a part of the translation workflow 704. The stylization process 750 utilizes pre-defined lists of client-specific rules to stylize the translated segment 126. For example, and without limitation, spaces can be inserted before measurements or a certain type of quotation marks can be utilized for a specific language. Other types of client-specific stylizations that are to be applied to the translated segment 126 can also be defined and utilized in a similar manner.

Once the translation workflow 704 has completed, the translated segment 126 can be returned in response to the request to translate the input segment 124 from the source language to the target language. Additional details regarding the operation of the translation workflow 704 will be provided below with regard to FIG. 8.

Figure 8:
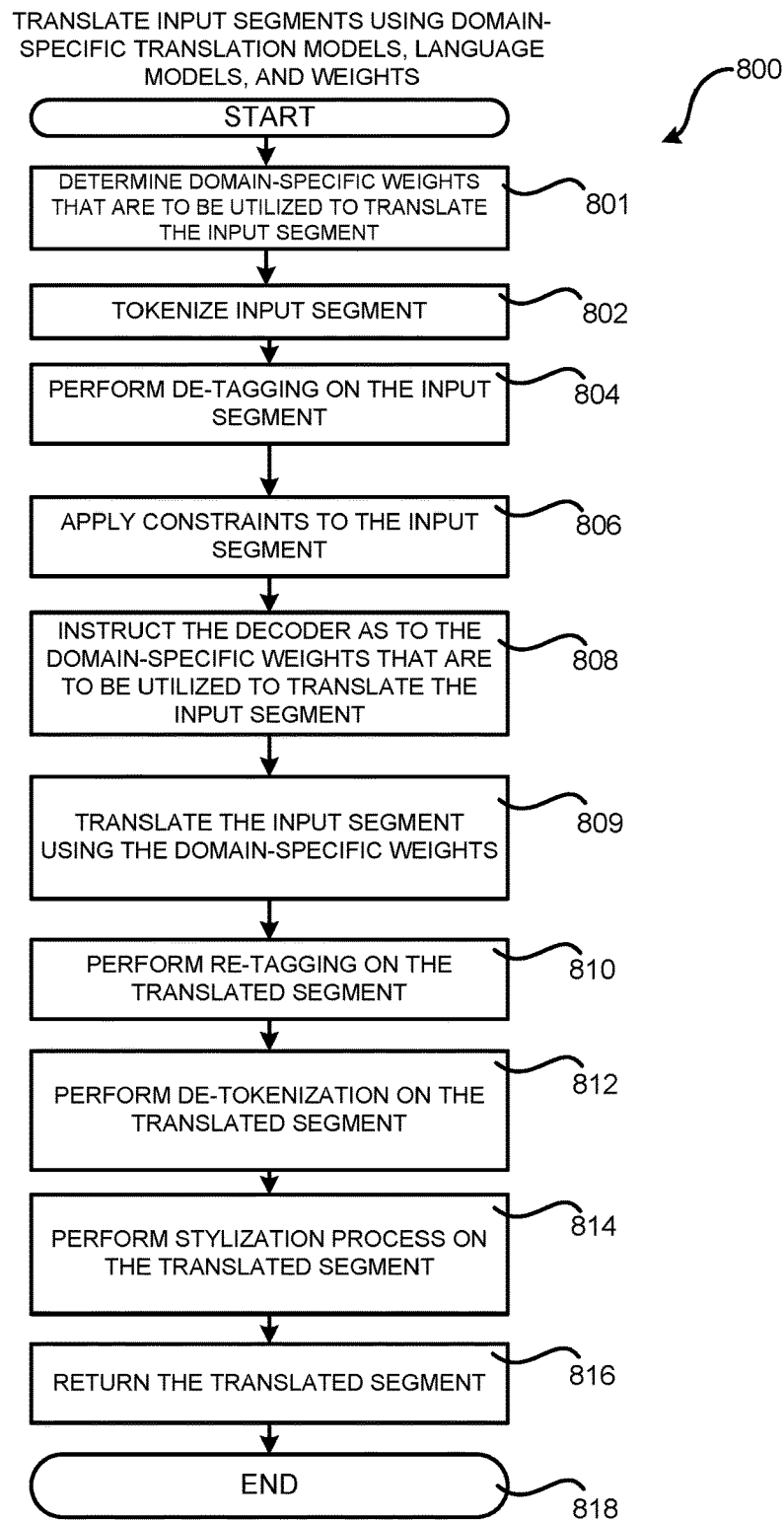
FIG. 8 is a flow diagram showing a routine that illustrates aspects of the operation of the machine translation system shown in FIG. 1B for translating input segments using domain-specific translation and language models, according to one configuration disclosed herein.

FIG. 8 is a flow diagram showing a routine 800 that illustrates aspects of the operation of the machine translation system shown in FIG. 1B for translating input segments using domain-specific language models 110, domain-specific translation models 108 and, potentially, cluster-based language models 110E, according to one configuration disclosed herein. The routine 800 begins at operation 801, where a pre-processing operation can be performed in order to determine the domain-specific weights 114 that are to be utilized to translate the input segment 124. As discussed above with regard to FIG. 5, a domain clustering process 125 is utilized in some configurations to classify the input segment 124 into one of the domains 109. The domain 109 into which the input segment 124 is classified can then be utilized to select the appropriate domain-specific model weights 114.

From operation 801, the routine 800 proceeds to operation 802, where the tokenization process 712 tokenizes the input segment 124 in the manner described above. Once the input segment 124 has been tokenized, the routine 800 proceeds from operation 802 to operation 804, where the de-tagging process 716 removes any tags or other types of formatting from the tokenized input segment 124. The routine 800 then proceeds from operation 804 to operation 806.

At operation 806, the constrain process 718 utilizes the term dictionary 720 to constrain the tokenized and de-tagged input segment 124. As discussed above, the constrain process 718 can utilize the term dictionary 720 to ensure that specified terms are translated in the same way regardless of the context in which they appear. From operation 806, the routine 800 proceeds to operation 808.

At operation 808, an indication can be provided to the machine translation decoder 724 as to which of the domain-specific model weights 114 are to be utilized to translate the input segment 124. In particular, and as described above, an indication of the domain 109 associated with the input segment 124 can be received from the domain clustering process 125. The domain-specific model weights 114 associated with the specified domain 109 can then be utilized to translate the input segment 124.

In another configuration, the input segment 124 can be classified as belonging to one of the domains 109 at translation time. The domain-specific model weights 114 associated with the domain 109 into which the input segment 124 is classified can then be utilized by the machine translation decoder 724 to translate the input segment 124. Once the domain-specific model weights 114 to be utilized have been identified, the routine 800 proceeds from operation 808 to operation 809.

At operation 809, the translation process 722 is performed to identify a likely translation of the input segment 124. As discussed above, the machine translation decoder 724 can utilize the domain-specific translation models 108 to map the phrases in the input segment 124 to candidate translations. The domain-specific language models 110, including the cluster-based language model 110E if utilized, can then generate feature scores for the candidate translations. The domain-specific model weights 114 selected at operation 808 are then applied to the feature scores generated by the domain-specific translation models 108 and the domain-specific language models 110. A combination of candidate translations for phrases in the input segment 124 having the highest combined feature score can then be selected as the translated segment 126.

From operation 809, the routine 800 proceeds to operation 810, where the re-tagging process 726 adds any tags or other types of formatting to the translated segment 126 that were removed from the input segment 124 by the de-tagging process 704. The routine 800 then proceeds from operation 810 to operation 812.

At operation 812, the de-tokenization process 728 is performed in order to negate the tokenization performed by the tokenization process 712. As discussed above, for example, contractions that were split apart by the tokenization process 712 can be rejoined. Other types of de-tokenization can also be performed. The routine 800 then proceeds from operation 812 to operation 814, where the stylization process 750 can apply client-specific stylistic elements to the translated segment 126. The routine 800 then proceeds from operation 814 to operation 816, where the translated segment 126 can be returned in response to a request to translate the input segment 124. For example, and without limitation, the translation service 122 can return a Web services reply that includes the translated segment 126. The routine 800 then proceeds from operation 816 to operation 818, where it ends.

Figure 9:
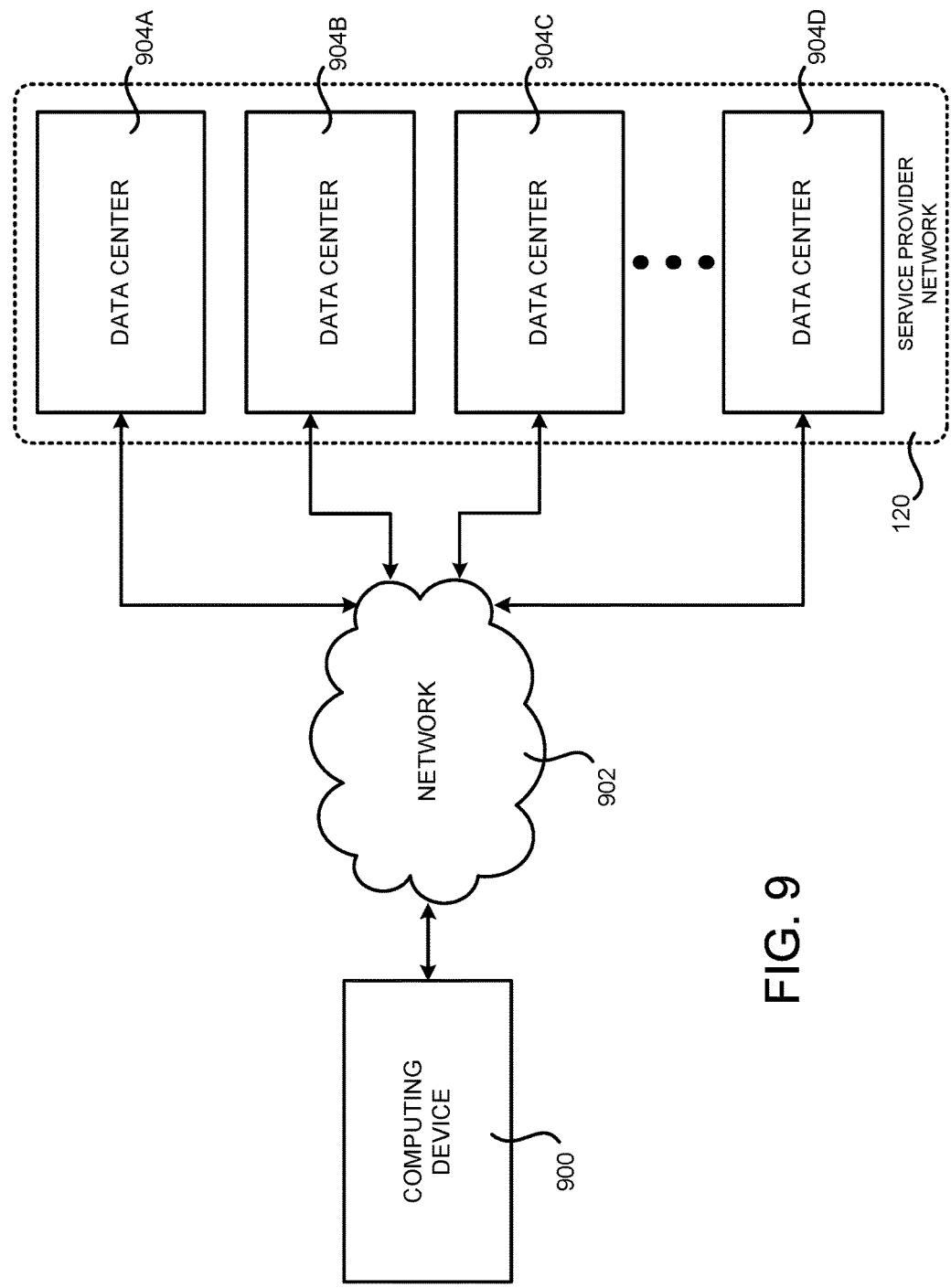
FIG. 9 is a system and network diagram that shows one illustrative operating environment for the configurations disclosed herein that includes a service provider network.

FIG. 9 is a system and network diagram that shows one illustrative operating environment for the configurations disclosed herein that includes a service provider network 120 that can be configured to implement the machine translation system described above. As discussed above, the service provider network 120 can execute network services that provide computing resources on a permanent or an as-needed basis. Among other types of functionality, the computing resources provided by the service provider network 120 can be utilized to implement the various network services described herein. As also discussed above, the computing resources provided by the service provider network 120 can include various types of computing resources, such as data processing resources like VM instances, data storage resources, networking resources, data communication resources, network services, and the like.

Each type of computing resource provided by the service provider network 120 can be general-purpose or can be available in a number of specific configurations. For example, data processing resources can be available as physical computers or VM instances in a number of different configurations. The VM instances can be configured to execute applications, including Web servers, application servers, media servers, database servers, some or all of the network services described above, and/or other types of programs. Data storage resources can include file storage devices, block storage devices, and the like. The service provider network 120 can also be configured to provide other types of computing resources not mentioned specifically herein.

As also discussed above, the computing resources provided by the service provider network 120 are enabled in one implementation by one or more data centers 904A-904D (which might be referred herein singularly as "a data center 904" or in the plural as "the data centers 904"). The data centers 904 are facilities utilized to house and operate computer systems and associated components. The data centers 904 typically include redundant and backup power, communications, cooling, and security systems. The data centers 904 can also be located in geographically disparate locations. One illustrative configuration for a data center 904 that can be utilized to implement the technologies disclosed herein will be described below with regard to FIG. 10.

The customers and other users of the service provider network 120 can access the computing resources provided by the service provider network 120 over a network 902, which can be a wide area communication network ("WAN"), such as the Internet, an intranet or an Internet service provider ("ISP") network or a combination of such networks. For example, and without limitation, a computing device 900 operated by a customer or other user of the service provider network 120 can be utilized to access the service provider network 120 by way of the network 902. It should be appreciated that a local-area network ("LAN"), the Internet, or any other networking topology known in the art that connects the data centers 904 to remote customers and other users can be utilized. It should also be appreciated that combinations of such networks can also be utilized.

Figure 10:
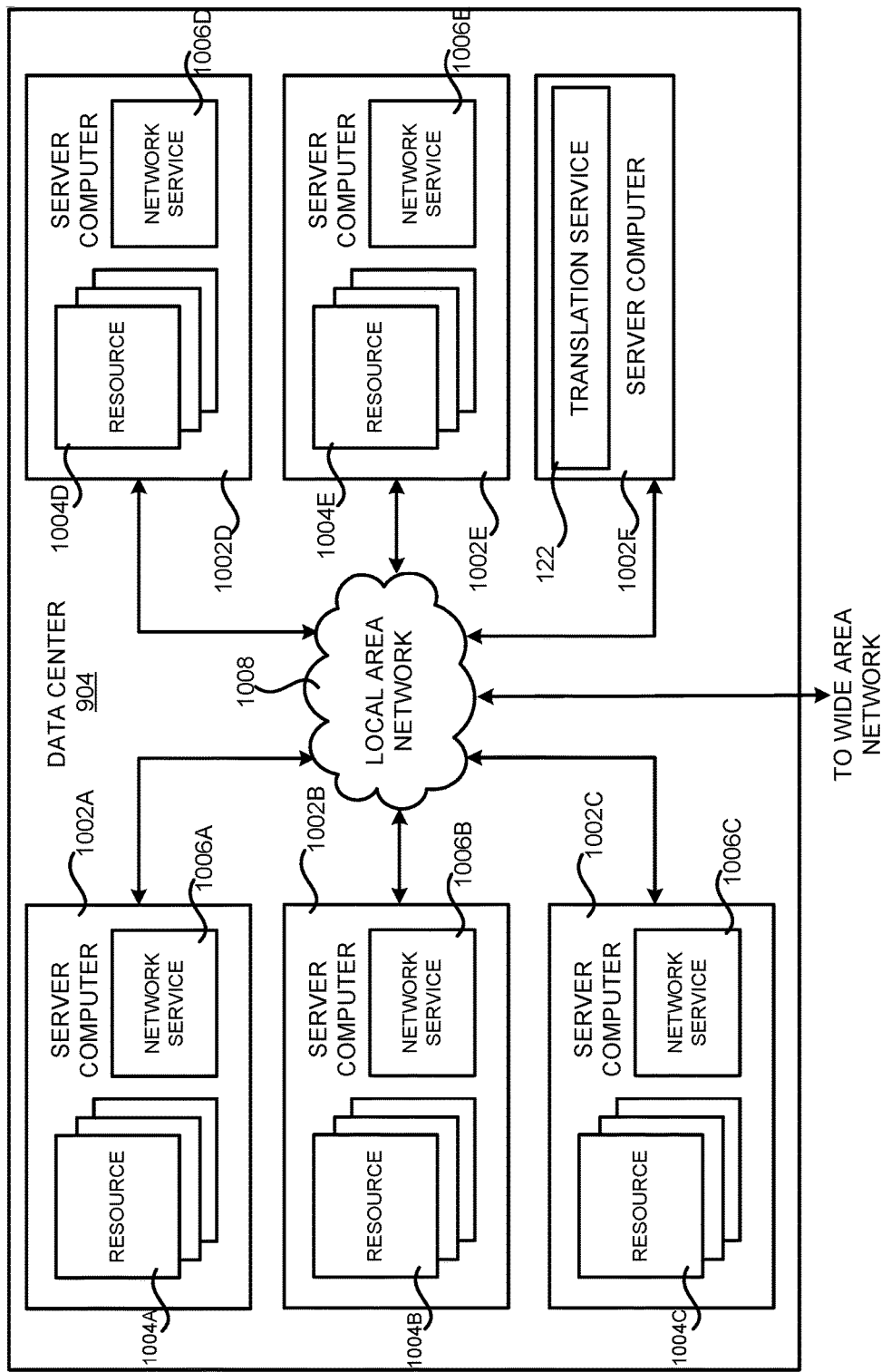
FIG. 10 is a computing system diagram illustrating a configuration for a data center that can be utilized to implement aspects of the technologies disclosed herein.

FIG. 10 is a computing system diagram that illustrates one configuration for a data center 904 that implements aspects of the technologies disclosed herein. The example data center 904 shown in FIG. 10 includes several server computers 1002A-1002F (which might be referred to herein singularly as "a server computer 1002" or in the plural as "the server computers 1002") for providing the computing resources 1004A-1004E.

The server computers 1002 can be standard tower, rackmount, or blade server computers configured appropriately for providing the computing resources 1004 described herein (illustrated in FIG. 10 as the computing resources 1004A-1004E). As mentioned above, the computing resources 1004 provided by the service provider network 120 can be data processing resources such as VM instances or hardware computing systems, data storage resources, database resources, networking resources, and others. Some of the servers 1002 can also be configured to execute network services 1006A-1006E, respectively, capable of instantiating, providing and/or managing the computing resources 1004, some of which are described in detail below with regard to FIG. 11.

The data center 904 shown in FIG. 10 also includes a server computer 1002F that can execute some or all of the software components described above. For example, and without limitation, the server computer 1002F can be configured to execute the translation service 122, which was described in detail above. The server computer 1002F can also be configured to execute other components and/or to store data for providing some or all of the functionality described herein. In this regard, it should be appreciated that the translation service 122 can execute on many other physical or virtual servers in the data centers 904 in various configurations.

In the example data center 904 shown in FIG. 10, an appropriate LAN 1008 is also utilized to interconnect the server computers 1002A-1002F. The LAN 1008 is also connected to the network 902 illustrated in FIG. 9. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 904A-904D, between each of the server computers 1002A-1002F in each data center 904, and, potentially, between computing resources 1004 in each of the data centers 904. It should be appreciated that the configuration of the data center 904 described with reference to FIG. 10 is merely illustrative and that other implementations can be utilized.

Figure 11:
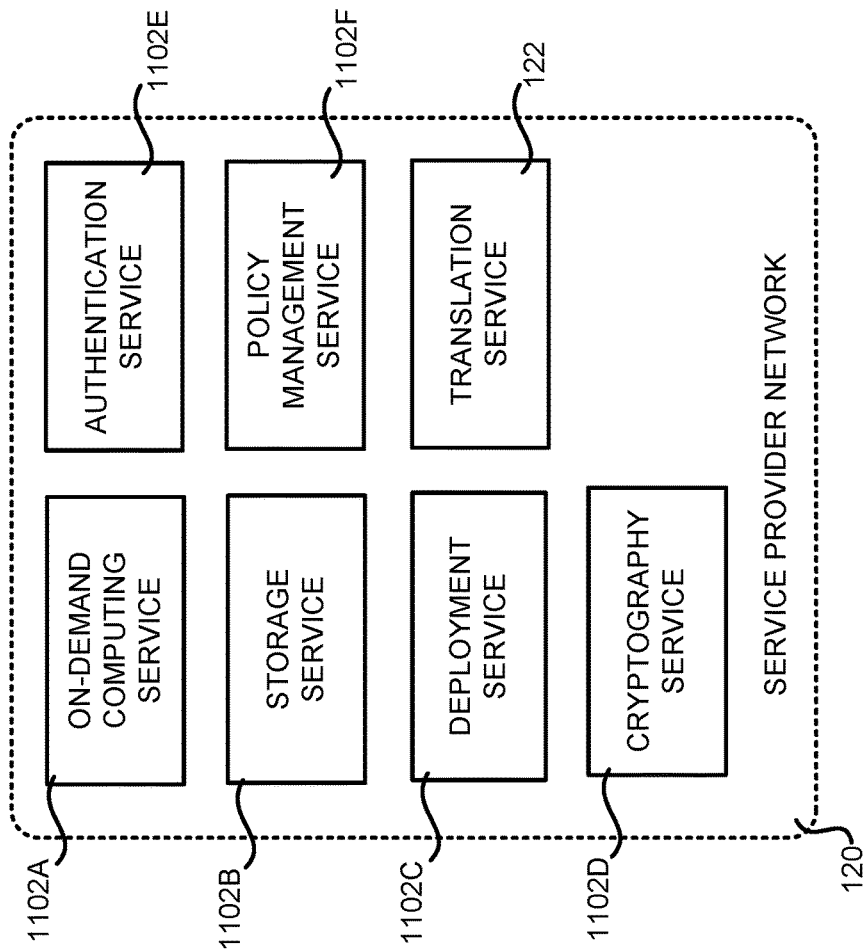
FIG. 11 is a network services diagram that shows aspects of several services that can be provided by and utilized within a service provider network configured to implement the various technologies disclosed herein.

FIG. 11 is a system and network diagram that shows aspects of several network services that can be provided by and utilized within a service provider network 120 in one configuration disclosed herein. In particular, and as discussed above, the service provider network 120 can provide a variety of network services to customers and other users of the service provider network 120 including, but not limited to, an on-demand computing service 1102A, the translation service 122, and a deployment service 1102C. The service provider network 120 can also provide other types of services including, but not limited to, a storage service 1102B, a cryptography service 1102D, an authentication service 1102E, and/or a policy management service 1102F, each of which is described in greater detail below. Additionally, the service provider network 120 can also provide other types of network services, some of which are also described in greater detail below.

It should be appreciated that customers of the service provider network 120 can include organizations or individuals that utilize some or all of the services provided by the service provider network 120. As described above, a customer or other user can communicate with the service provider network 120 through a network, such as the network 902 shown in FIG. 9. Communications from a customer computing device to the service provider network 120 can cause the services provided by the service provider network 120 to operate in accordance with the described configurations or variations thereof.

It is noted that not all configurations described include the services described with reference to FIG. 11 and that additional network services can be provided in addition to or as an alternative to the services explicitly described herein. Each of the services shown in FIG. 11 can also expose Web service interfaces that enable a caller to submit appropriately configured application programming interface ("API") calls to the various services through Web service requests. In addition, each of the services can include service interfaces that enable the services to access each other (e.g., to enable a virtual computer system provided by the on-demand computing service 1102A to store data in or retrieve data from the storage service 1102B). Additional details regarding some of the services shown in FIG. 11 will now be provided.

The on-demand computing service 1102A can be a collection of computing resources configured to instantiate VM instances or to provide other types of computing resources 1004 on demand. For example, a customer or other user of the service provider network 120 can interact with the on-demand computing service 1102A (via appropriately configured and authenticated API calls, for example) to provision and operate VM instances that are instantiated on physical computing devices hosted and operated by the service provider network 120. The VM instances can be used for various purposes, such as to operate as servers supporting the network services described herein, a Web site, to operate business applications or, generally, to serve as computing resources for the customer. Other applications for the VM instances can be to support database applications, electronic commerce applications, business applications and/or other applications. Although the on-demand computing service 1102A is shown in FIG. 11, any other computer system or computer system service can be utilized in the service provider network 120 to implement the functionality disclosed herein, such as a computer system or computer system service that does not employ virtualization and instead provisions computing resources on dedicated or shared computers/servers and/or other physical devices.

The storage service 1102B can include software and computing resources that collectively operate to store data using block or file-level storage devices (and/or virtualizations thereof). The storage devices of the storage service 1102B can, for example, be operationally attached to virtual computer systems provided by the on-demand computing service 1102A to serve as logical units (e.g., virtual drives) for the computer systems. A storage device can also enable the persistent storage of data used/generated by a corresponding virtual computer system where the virtual computer system service might only provide ephemeral data storage.

The service provider network 120 can also include a cryptography service 1102D. The cryptography service 1102D can utilize storage services of the service provider network 120, such as the storage service 1102B, to store encryption keys in encrypted form, whereby the keys can be usable to decrypt customer keys accessible only to particular devices of the cryptography service 1102D. The cryptography service 1102D can also provide other types of functionality not specifically mentioned herein.

As illustrated in FIG. 11, the service provider network 120, in various configurations, also includes an authentication service 1102E and a policy management service 1102F. The authentication service 1102E, in one example, is a computer system (i.e., collection of computing resources 1004) configured to perform operations involved in authentication of users. For instance, one of the services shown in FIG. 11 can provide information from a user to the authentication service 1102E to receive information in return that indicates whether or not the requests submitted by the user are authentic.

The policy management service 1102F, in one example, is a network service configured to manage policies on behalf of customers or internal users of the service provider network 120. The policy management service 1102F can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 120 can additionally maintain other services based, at least in part, on the needs of its customers. For instance, the service provider network 120 can maintain a deployment service 1102C for deploying program code and/or a database service (not shown in FIG. 11) for storing some or all of the data described herein. A database service can be a collection of computing resources that collectively operate to create, maintain, and allow queries to be performed on databases stored within the service provider network 120. For example, a customer or other user of the service provider network 120 can operate and manage a database from the database service by utilizing appropriately configured network API calls. This, in turn, can allow the customer to maintain and potentially scale the operations in the database. Other services include object-level archival data storage services, and services that manage, monitor, interact with, or support other services. The service provider network 120 can also be configured with other network services not specifically mentioned herein in other configurations.

Figure 12:
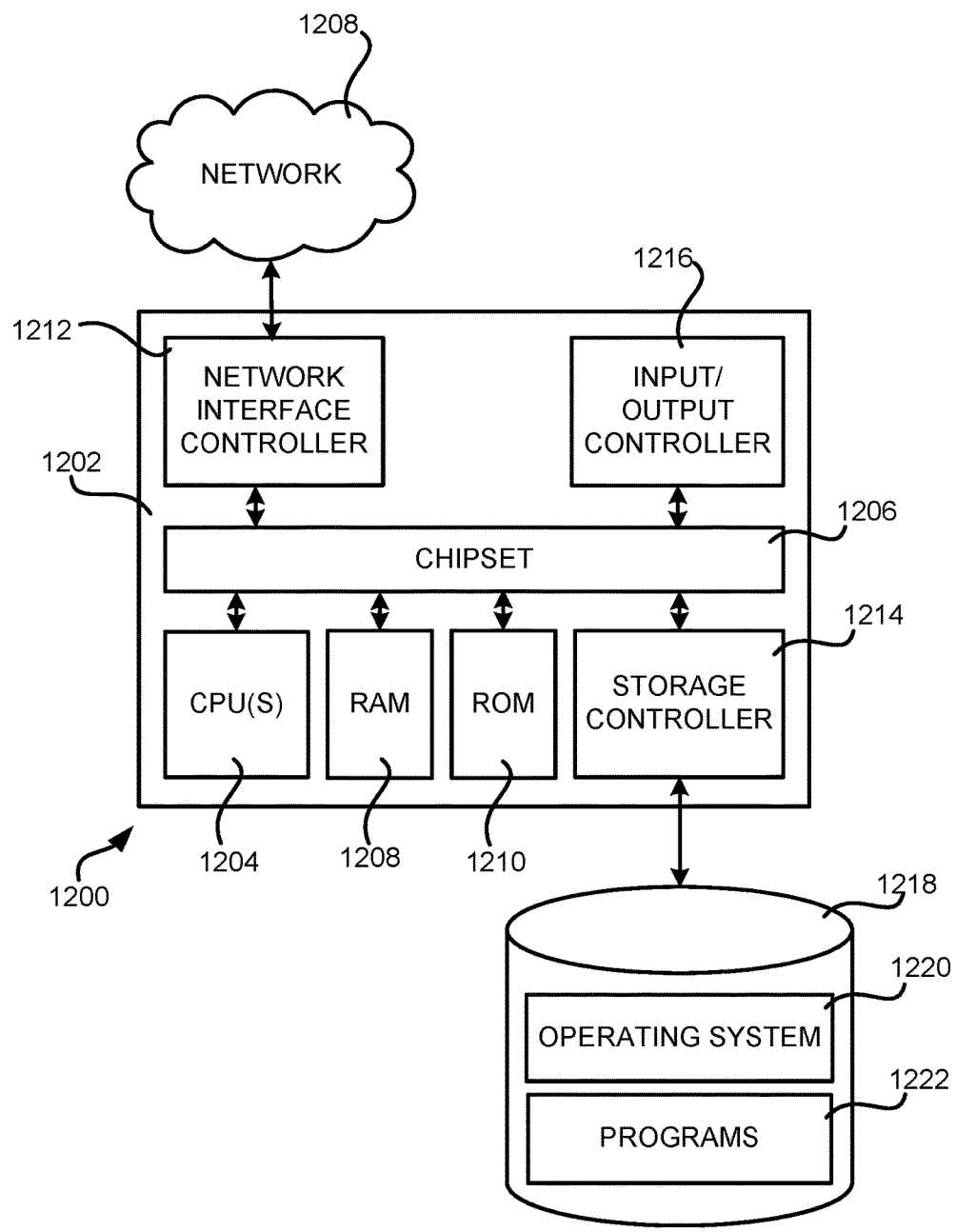
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1208. The chipset 1206 can include functionality for providing network connectivity through a NIC 1212, such as a gigabit Ethernet adapter. The NIC 1212 is capable of connecting the computer 1200 to other computing devices over the network 1208. It should be appreciated that multiple NICs 1212 can be present in the computer 1200, connecting the computer to other types of networks and remote computer systems.

The computer 1200 can be connected to a mass storage device 1218 that provides non-volatile storage for the computer. The mass storage device 1218 can store an operating system 1220, programs 1222, and data, which have been described in greater detail herein. The mass storage device 1218 can be connected to the computer 1200 through a storage controller 1214 connected to the chipset 1206. The mass storage device 1218 can consist of one or more physical storage units. The storage controller 1214 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1200 can store data on the mass storage device 1218 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1218 is characterized as primary or secondary storage, and the like.

For example, the computer 1200 can store information to the mass storage device 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the mass storage device 1218 by detecting the physical states or characteristics of one or more particular locations within the physical storage units.

In addition to the mass storage device 1218 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1218 can store an operating system 1220 utilized to control the operation of the computer 1200. According to one configuration, the operating system comprises the LINUX operating system. According to another configuration, the operating system comprises the WINDOWS® SERVER operating system from MICROSOFT CORPORATION. According to further configurations, the operating system can comprise the UNIX operating system or one of its variants. It should be appreciated that other operating systems can also be utilized. The mass storage device 1218 can store other system or application programs and data utilized by the computer 1200.

In one configuration, the mass storage device 1218 or other computer-readable storage media is encoded with computer-executable instructions which, when loaded into the computer 1200, transform the computer from a general-purpose computing system into a special-purpose computer capable of implementing the configurations described herein. These computer-executable instructions transform the computer 1200 by specifying how the CPUs 1204 transition between states, as described above. According to one configuration, the computer 1200 has access to computer-readable storage media storing computer-executable instructions which, when executed by the computer 1200, perform the various processes described above with regard to FIGS. 1-8. The computer 1200 can also include computer-readable storage media for performing any of the other computer-implemented operations described herein.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, a plotter, or other type of output device. It will be appreciated that the computer 1200 might not include all of the components shown in FIG. 12, can include other components that are not explicitly shown in FIG. 12, or might utilize an architecture completely different than that shown in FIG. 12.

Based on the foregoing, it should be appreciated that a multi-domain machine translation system with training data clustering and dynamic domain adaptation has been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims. It is to be further understood that the technologies disclosed herein can be utilized in conjunction with other machine translation features and systems including, but not limited to, those described in U.S. patent application Ser. No. 14/867,932, which was filed on Sep. 28, 2015, and entitled "Optimized Statistical Machine Learning System with Rapid Adaptation Capability", and which is expressly incorporated by reference herein in its entirety.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An apparatus, comprising:
    one or more-processors; and
    one or more non-transitory computer-readable storage media having instructions stored thereupon which are executable by the one or more processors and which, when executed, cause the apparatus to:
        identify a plurality of domains in general training data comprising client training data and background training data, the client training data and the background training data being expressed in a source language and a target language;
        assign segments in the general training data to one of the plurality of domains to create domain-specific training data for the plurality of domains;
        generate a domain-specific translation model for the plurality of domains using the domain-specific training data;
        generate a domain-specific language model for the plurality of domains using the domain-specific training data;
        extract domain-specific tuning data from the domain-specific training data;
        generate candidate translations using the domain-specific tuning data, the domain-specific language models, and the domain-specific translation models;
        determine feature scores corresponding to individual ones of the domain-specific language models and the domain-specific translation models based at least in part on the candidate translations;
        learn, based at least in part on the domain-specific tuning data and the feature scores, domain-specific model weights associated with the feature scores;

generate a translation package comprising the domain-specific language models, the domain-specific translation models, and the domain-specific model weights;

receive a request to translate an input segment in the source language into the target language;

identify individual domain-specific model weights to be utilized to translate the input segment;

identify one or more phrases associated with the input segment; and translate the input segment into the target language by selecting, based at least in part on the individual domain-specific model weights, one or more candidate translations of the candidate translations corresponding to the one or more phrases of the input segment.

2. The apparatus of claim 1, wherein the plurality of domains in the general training data are identified using an unsupervised domain clustering process.

3. The apparatus of claim 2, wherein the unsupervised domain clustering process comprises k-means clustering.

4. The apparatus of claim 1, wherein to identify the individual domain-specific model weights to be utilized to translate the input segment comprises:

receiving, with the input segment, an indication of a domain associated with the input segment; and determining the individual domain-specific model weights to be utilized to translate the input segment based on the indication.

5. The apparatus of claim 1, wherein to identify the individual domain-specific model weights to be utilized to translate the input segment comprises:

associating the input segment with one or more of the plurality of domains; and determining the individual domain-specific model weights to be utilized to translate the input segment based upon the one or more of the plurality of domains with which the input segment is associated.

6. The apparatus of claim 1, wherein the non-transitory computer-readable storage media has further instructions stored thereupon to cause the translation package to be deployed to one or more host computers in a service provider network for use in translating input segments in the source language to the target language.

7. The apparatus of claim 1, wherein the non-transitory computer-readable storage media has further instructions stored thereupon to:

tokenize the input segment by removing at least one of a contraction or punctuation from the input segment; and de-tokenize the translated input segment by adding at least one of a contraction or punctuation to the input segment.

8. A computer-implemented method for statistical machine translation, the method comprising:

assigning segments in general training data to one of a plurality of domains to create domain-specific training data for the plurality of domains;

generating domain-specific translation models for the plurality of domains using the domain-specific training data;

generating domain-specific language models for the plurality of domains using the domain-specific training data;

extracting domain-specific tuning data from the domain-specific training data;

generating candidate translations using the domain-specific tuning data, the domain-specific language models, and the domain-specific translation models;

determining feature scores corresponding to individual ones of the domain-specific language models and the domain-specific translation models based at least in part on the candidate translations;

learning, based at least in part on the domain-specific tuning data and the feature scores, domain-specific model weights for the plurality of domains;

utilizing the domain-specific language models, the domain-specific translation models, and the domain-specific model weights to translate input segments from a source language to a target language;

receiving a request to translate a particular input segment in the source language into the target language;

identifying individual domain-specific model weights to be utilized to translate the particular input segment;

identifying one or more phrases associated with the particular input segment; and translating the particular input segment into the target language by selecting, based at least in part on the individual domain-specific model weights, one or more candidate translations of the candidate translations corresponding to the one or more phrases of the particular input segment.

9. The computer-implemented method of claim 8, wherein assigning segments in general training data to one of a plurality of domains to create domain-specific training data for the plurality of domains comprises:

identifying a plurality of domains in the general training data; and assigning the segments in the general training data to one of the plurality of domains to create the domain-specific training data.

10. The computer-implemented method of claim 9, wherein the plurality of domains in the general training data are identified using an unsupervised domain clustering process.

11. The computer-implemented method of claim 10, wherein the unsupervised domain clustering process comprises k-means clustering.

12. The computer-implemented method of claim 8, wherein identifying the individual domain-specific model weights to be utilized to translate the particular input segment comprises:

receiving, with the particular input segment, an indication of a domain associated with the particular input segment; and determining the individual domain-specific model weights to be utilized to translate the particular input segment based on the indication.

13. The computer-implemented method of claim 8, wherein identifying the individual domain-specific model weights to be utilized to translate the particular input segment comprises:

associating the particular input segment with one or more of the plurality of domains responsive to receiving the request to translate the particular input segment; and determining the individual domain-specific model weights to be utilized to translate the particular input segment based upon the one or more of the plurality of domains with which the particular input segment is associated.

14. The computer-implemented method for statistical machine translation of claim 8, further comprising:

tokenizing the input segment by removing at least one of a contraction or punctuation from the input segment; and de-tokenizing the translated input segment by adding at least one of a contraction or punctuation to the input segment.

15. A non-transitory computer-readable storage media having instructions stored thereupon that are executable by one or more processors and which, when executed, cause the one or more processors to:

receive a request to translate an input segment in a source language into a target language;

responsive to receiving the request, identify a domain for the input segment;

identify individual domain-specific model weights for the identified domain, wherein the domain-specific model weights are learned based at least in part on domain-specific tuning data and feature scores corresponding to individual ones of domain-specific language models and domain-specific translation models;

identify one or more phrases associated with the input segment; and translate the input segment from the source language into the target language by selecting, based at least in part on the individual domain-specific model weights, one or more candidate translations corresponding to the one or more phrases of the input segment.

16. The non-transitory computer-readable storage media of claim 15, wherein identifying the individual domain-specific model weights to be utilized to translate the input segment comprises:

receiving, with the input segment, an indication of the domain associated with the input segment; and determining the individual domain-specific model weights to be utilized to translate the input segment based on the indication.

17. The non-transitory computer-readable storage media of claim 15, wherein identifying the individual domain-specific model weights to be utilized to translate the input segment comprises:

assigning the input segment to one of a plurality of domains responsive to receiving the request to translate the input segment; and determining the individual domain-specific model weights to be utilized to translate the input segment based upon the one of the plurality of domains to which the input segment is assigned.

18. The non-transitory computer-readable storage media of claim 15, having further instructions stored thereupon to:

assign segments in general training data to one of a plurality of domains to create domain-specific training data for the plurality of domains;

generate the domain-specific translation models for the plurality of domains using the domain-specific training data; and generate the domain-specific language models for the plurality of domains using the domain-specific training data.

19. The non-transitory computer-readable storage media of claim 18, wherein the plurality of domains in the general training data are identified using an unsupervised domain clustering process.

20. The non-transitory computer-readable storage media of claim 19, wherein the unsupervised domain clustering process comprises k-means clustering.

* * * * *